United States Patent
Milani et al.

(10) Patent No.: US 12,466,903 B2
(45) Date of Patent: Nov. 11, 2025

(54) CATALYSTS AND PROCESS FOR OLEFINS AND POLAR VINYL MONOMERS COPOLYMERIZATION AND OLEFINS HOMOPOLYMERIZATION

(71) Applicant: UNIVERSITA' DEGLI STUDI DI TRIESTE, Trieste (IT)

(72) Inventors: Barbara Milani, Gradisca d'Isonzo (IT); Anna Dall'Anese, Vittorio Veneto (IT); Cyril Godard, Els Pallaresos Tarragona (ES); Myriam Yasmine Souleymanou, Terragona Tarragona (ES)

(73) Assignee: UNIVERSITA' DEGLI STUDI DI TRIESTE, Trieste (IT)

( * ) Notice: Subject to any disclaimer, the term of this patent is extended or adjusted under 35 U.S.C. 154(b) by 706 days.

(21) Appl. No.: 17/796,897

(22) PCT Filed: Feb. 17, 2020

(86) PCT No.: PCT/EP2020/054037
§ 371 (c)(1),
(2) Date: Aug. 2, 2022

(87) PCT Pub. No.: WO2021/164844
PCT Pub. Date: Aug. 26, 2021

(65) Prior Publication Data
US 2023/0053987 A1    Feb. 23, 2023

(51) Int. Cl.
C08F 4/70    (2006.01)
C07C 251/08    (2006.01)
C08F 10/02    (2006.01)

(52) U.S. Cl.
CPC ............ C08F 4/7006 (2013.01); C08F 10/02 (2013.01)

(58) Field of Classification Search
CPC . C07C 251/08; C07C 2603/50; C07F 15/006; C08F 4/7006; C08F 210/02;
(Continued)

(56) References Cited

U.S. PATENT DOCUMENTS

2002/0156212 A1* 10/2002 Johnson ................ C07F 15/025
526/161

FOREIGN PATENT DOCUMENTS

EP    805826 A2    11/1997
EP    1760097 A2 *  3/2007  ............ C08F 210/00
(Continued)

OTHER PUBLICATIONS

Zhang, et al, "Electron-Rich Metal Cations Enable Synthesis of High Molecular Weight, Linear Functional Polyethylenes," J. Am. Chem. Soc. 2018, 140, 8841-8850. (Year: 2018).*
(Continued)

Primary Examiner — Fred M Teskin
(74) Attorney, Agent, or Firm — Leason Ellis LLP

(57) ABSTRACT

The invention relates to a family of Pd(II)-based catalysts of general formula (I) reproduced below for use in the production of olefin/polar vinyl monomer copolymers and olefin homopolymers. The invention also refers to ligands that are intermediates in the synthesis of the catalysts, to the process for the synthesis of homo- and copolymers using these catalysts, and to the homo- and copolymers thus obtained.

(Continued)

(56) References Cited

FOREIGN PATENT DOCUMENTS

| EP | 2891511 A1 | 7/2015 |
|---|---|---|
| EP | 3208285 A1 | 8/2017 |

OTHER PUBLICATIONS

Bansleben et al. "New Late Transition Metal Catalysts for the Polymerization of Ethylene." Proceedings of MetCon'98: "Polymers in Transition" (Jun. 1998). 20 pages.

Chen et al. "Synthesis of functional olefin copolymers with controllable topologies using a chain-walking catalyst." Journal of the American Chemical Society 125.22 (2003): 6697-6704.

International Search Report and Written Opinion for corresponding International Patent Application No. PCT/EP2020/054037 dated Oct. 30, 2020. 12 pages.

Scarel et al. "Subtle balance of steric and electronic effects for the synthesis of atactic polyketones catalyzed by Pd complexes with meta-substituted aryl-BIAN ligands." Organometallics 27.7 (2008): 1486-1494.

* cited by examiner

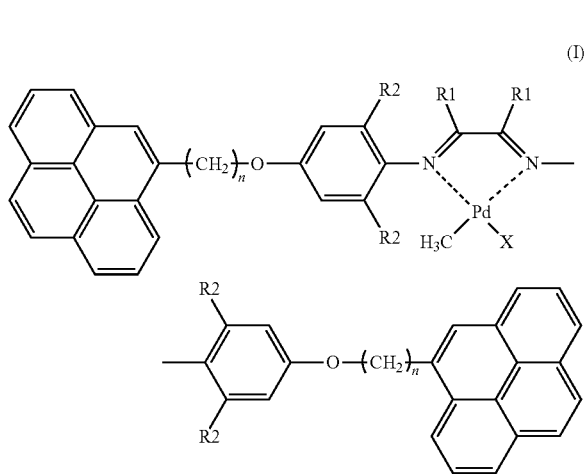

(I)

8 Claims, 7 Drawing Sheets

(58) Field of Classification Search
CPC ... C08F 220/14; C08F 2500/06; C08F 2500/09; C08F 220/1804
See application file for complete search history.

CATALYSTS AND PROCESS FOR OLEFINS AND POLAR VINYL MONOMERS COPOLYMERIZATION AND OLEFINS HOMOPOLYMERIZATION

CROSS-REFERENCE TO RELATED PATENT APPLICATIONS

This application is a U.S. National Stage Application under 35 U.S.C. § 371 of International Patent Application No. PCT/EP2020/054037 filed Feb. 17, 2020, which is incorporated by reference in its entirety. The International Application was published on Aug. 26, 2021, as International Publication No. WO 2021/164844 A1.

FIELD OF THE INVENTION

The present invention relates to a catalyst for copolymerization of olefins and polar vinyl monomers and homopolymerization of olefins, and to the polymerization processes using this catalyst; the invention also relates to intermediate compounds used as ligands in the preparation of the catalyst and to the copolymers obtainable through the process.

STATE OF THE ART

Homopolymers of olefins and copolymers with other types of comonomers, in particular vinylic esters, are used for several applications such as packaging or for the production of molded items, as well as elastomers for molded goods, belts of various types, adhesives, etc.

It is well known in the field that the structure of polymers, and hence their properties and possible uses, are highly dependent on the catalyst and specific conditions adopted during their synthesis. As a consequence, new catalysts are continuously studied, and/or new processes are continuously explored, in order to obtain novel polymers with useful properties.

New polymers, and the catalysts/process conditions for their production, are the object of intense studies and of a great number of documents, of which we report below just a few examples.

Patent application EP 2891511 A1 discloses a process for producing polyolefins useful as defoamers, to be used e.g. in coating and paint applications. The polyolefins obtained in this document have a relatively low number average molecular weight of between about 500 to 10,000 Da (determined by NMR), and are obtained by using a catalyst composition made of a compound of a late transition metal, an organic chelating ligand and a second organometallic compound; a preferred catalytic composition is obtained by mixing (a) a Pd(II) or Ni(II) carboxylate complex, (b) a neutral or anionic N,O-chelating ligand, and (c) an organometallic compound other than (a).

Patent application EP 3208285 A1 discloses the production of ethylene-based ionomers with improved mechanical properties and a high melting temperature. This document gives an extremely broad definition of the catalyst to be employed in the polymerization process, but indicates as preferred catalysts of formula below:

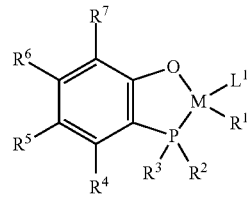

in which M may be nickel or palladium.

Finally, patent EP 805826 B1 discloses a very broad range of olefin-based homo- and copolymers obtained with several possible catalysts having different formulas, among which the ones having formulas reproduced below:

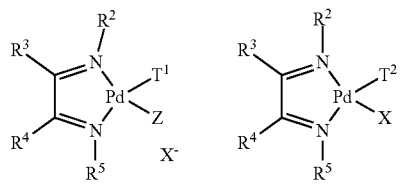

wherein:
  $R^2$ and $R^5$ are selected among hydrocarbyl or substituted hydrocarbyl, provided that the carbon atom bound to the imino nitrogen atom has at least two carbon atoms bound to it;
  $R^3$ and $R^4$ are selected among hydrogen, hydrocarbyl, substituted hydrocarbyl, or $R^3$ and $R^4$ taken together are hydrocarbylene or substituted hydrocarbylene to form a ring;
  $T^1$ and $T^2$ may be hydrogen, hydrocarbyl groups or acyl groups;
  Z is a neutral Lewis base wherein the donating atom is nitrogen, sulfur or oxygen; and
  X is defined as a "weakly coordinating" anion.

Despite the huge amount of research works in the field, there exists a continuous need of identifying novel catalysts and processes for making novel polymers of interest, in order to broaden the spectrum of available materials and related physico-chemical properties, useful for the development of new products.

One problem with the processes presently adopted in the industry is that they require high temperatures, generally in excess of 200° C., and high pressures, generally in the range of hundreds of bar. These processes do not provide control on the structure of the produced macromolecules.

With regard in particular to copolymers obtained from olefins and polar monomers, a problem still open in the art is that the presently available catalysts and processes may lead to either copolymers in which the polar monomers are randomly distributed in the polymer chain, but with a high content of incorporated polar monomer and leading to copolymers of low molecular weight; or else, copolymers of medium/high molecular weight, but in which the polar monomers accumulate at the end of the branches of the main polymer chain.

Objects of the present invention are to provide a novel class of catalysts for copolymerization of olefins with polar vinyl monomers and homo-polymerization of olefins, the process using these new catalysts, the new polymers made available by the process and intermediate compounds in the synthesis of the catalysts.

SUMMARY OF THE INVENTION

These objects are achieved by the present invention, which in a first aspect thereof relates to a novel catalyst for the preparation of olefin/polar vinyl monomer copolymers and olefin homopolymers, said catalyst having the general formula (I) shown below:

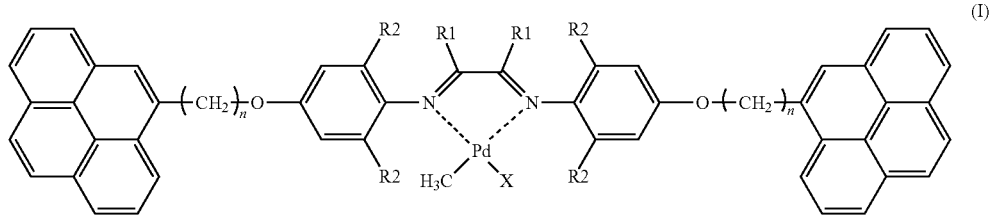

wherein:
- palladium is in oxidation state +2;
- the dashed lines indicate coordination of palladium by the two nitrogen atoms;
- R1 is selected between hydrogen and methyl;
- R2 is selected between methyl and isopropyl;
- n is an integer from 1 to 4;
- X is selected between chloride and acetonitrile, and when is X=$CH_3CN$ a monovalent counter-anion Y is present to balance the charge of palladium.

In a second aspect thereof, the invention is about a process for the preparation of olefin/polar vinyl monomer copolymers and olefin homopolymers, in which a catalyst of formula (I) is employed, which may carried out at a temperature lower than 70° C. and an olefin pressure lower than 15 bar.

Other objects of the invention are the ligands used as intermediates for the production of the catalysts of formula (I), and the homo- or copolymers obtainable through the use of said catalysts that feature a content of the polar monomer lower than 10%, the polar monomer inserted either into the main chain or both into the main chain and at the end of the branches in the same macromolecule, and a molecular weight in the range 800-300,000 Dalton.

DETAILED DESCRIPTION OF THE INVENTION

Figure 1:
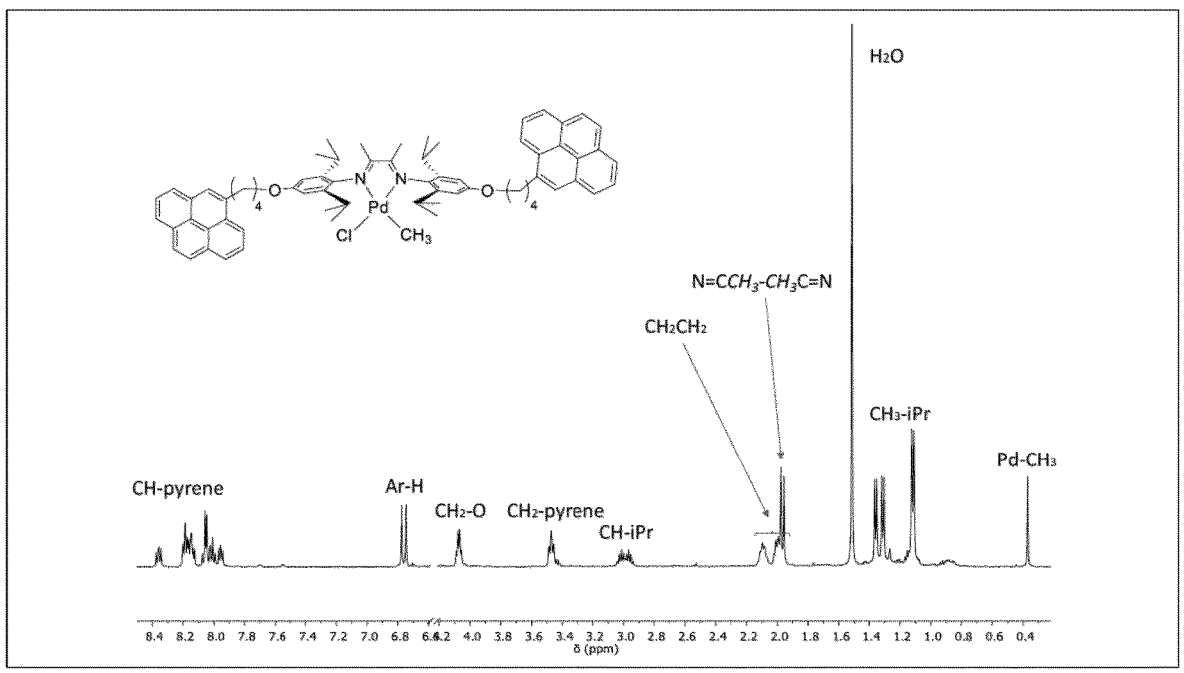
FIGS. 1 and 2 show the $^1$H-NMR spectra of two possible catalysts of the invention.

The invention will be described below with reference to the figures.

The catalysts of the invention are similar to one class of catalysts described in patent EP 805826 B1, in particular to the compounds of general formulas reported above. However, EP 805826 B1 simply requires that the carbon atoms directly bound to the nitrogen atoms be in their turn bound to at least two further carbon atoms. This indication by no means suggests the particular substitutions of the nitrogen atoms in the diazabutadiene moiety of the compounds of the invention; moreover, the teachings of this prior art document do not allow obtaining the advantages achieved operating according to a preferred embodiment (described below) of the process of the present invention, namely, the possibility of obtaining copolymers wherein polar monomers are either randomly distributed in the main chain of the polymer, or both in the main chain and at the end of the branches in the same macromolecule, and the possibility to modulate the relative distribution of the polar monomers between the two different ways of incorporation, and at the same time having a content of incorporated polar monomer lower than 20 mol %. As in the description of the prior art, the catalysts reported in the present invention are active at low temperatures and pressures.

In the description below, the following conventions and abbreviations are adopted:
- as the oxidation state of palladium in the compounds described in the following is always +2, the indication Pd(II) (usual in the field of complexes) will not be adopted to avoid confusion with general formula (II) of ligands of the invention;
- DAB: 1,4-diazabutadiene;
- Me: methyl;
- i-Pr: isopropyl;
- NCMe: acetonitrile
- Pyr: pyrene
- cod: cis,cis-1,5-cyclooctadiene.

In the first aspect thereof, the invention relates to the catalysts of general formula (I) reported above.

These catalysts are obtained by coordinating a palladium ion with a DAB-based ligand, having general formula (II) shown below, in which R1 and R2 have the meanings given above:

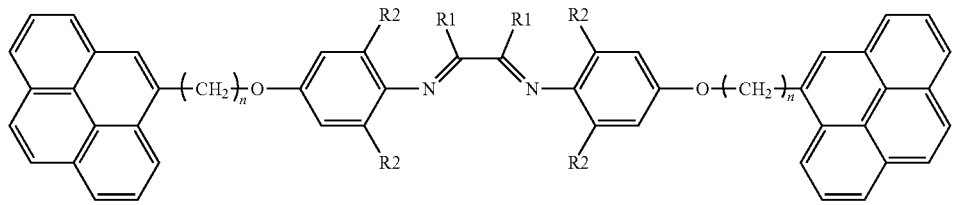

The DAB-based ligand has a very specific structure, in which the two carbon atoms in the DAB moiety may be unsubstituted or both substituted with methyl, while the two nitrogen atoms of the DAB moiety each bear either a 4-(pyren-2-yl)-n-butoxyl-2,6-dimethylphenyl group or a 4-(pyren-2-yl)-n-butoxyl-2,6-diisopropylphenyl group. As apparent from formula (II) above, the DAB-based ligand is symmetric with respect to the C—C bond in the DAB moiety.

Specifically, the possible ligands according to the invention (obtained by combining the possible meanings of R1 and R2, and using the abbreviations indicated above) are:

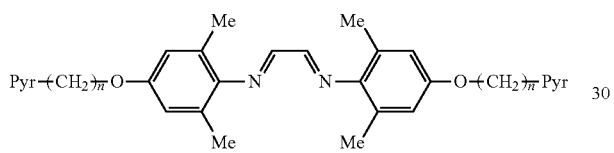
(IIa)

(IIb)

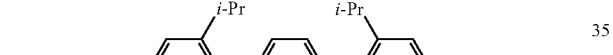
(IIc)

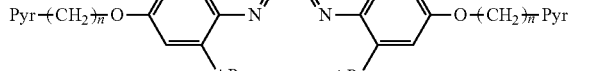
(IId)

Ligands (IIa) and (IIb), in which is R1=H, may be prepared by reaction of 1,4-dioxane-2,3-diol respectively with 4-(pyren-2-yl)-n-butoxyl-2,6-dimethylaniline and 4-(pyren-2-yl)-n-butoxyl-2,6-diisopropylaniline, in a 1:2 molar ratio between the diol and the selected aniline.

Ligands (IIc) and (IId), in which is R1=Me, may be prepared by reaction of 2,3-dimethyl-2,3-butanedione respectively with 4-(pyren-2-yl)-n-butoxyl-2,6-dimethylaniline and 4-(pyren-2-yl)-n-butoxyl-2,6-diisopropylaniline, in a 1:2 molar ratio between the butanedione and the selected aniline.

In turn, the two anilines may be prepared by reaction of either 4-amino-3,5-dimethylphenol or 4-amino-3,5-diisopropylphenol with 2-(4-iodobutyl)pyrene in the presence of cesium carbonate, according to methods known to the person skilled in organic syntheses.

Ligands (IIa)-(IId), intermediates in the production of the catalysts of formula (I), are further objects of the invention.

The catalysts of the invention may either be neutral, or in the form of a complex with electrical charge +1 balanced by a counter-anion with charge −1.

The neutral catalysts of the invention may be prepared by reacting one of the ligands (IIa)-(IId) with the chloridocyclooctadienemethylpalladium complex of formula (III) reported below, following the procedure described in the paper "Subtle balance of steric and electronic effects for the synthesis of atactic polyketones catalyzed by Pd complexes with meta-substituted aryl-BIAN ligands", A. Scarel et al., Organometallics, 2008, 27, 7, 1486-1494:

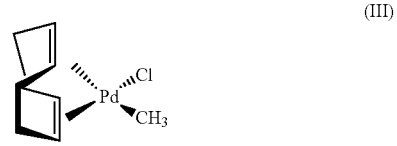
(III)

More specifically the synthetic procedure is based on the reaction in dichloromethane (DCM) solution of 1.1 equivalents of the ligand with the palladium precursor (III), at room temperature. After 22 h, the desired product precipitates upon concentration of the reaction mixture and it is isolated by filtration under reduced pressure.

The neutral catalysts of the invention obtained in this way have the formulas (Ia)-(Id) below:

(Ia)

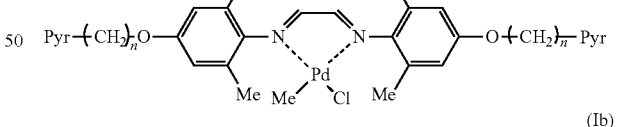
(Ib)

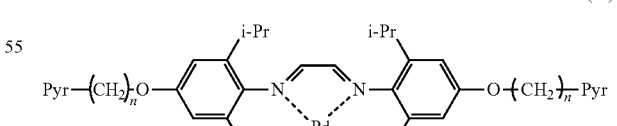
(Ic)

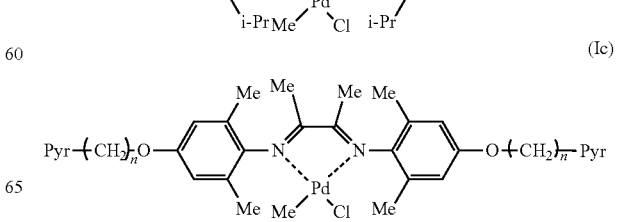

-continued

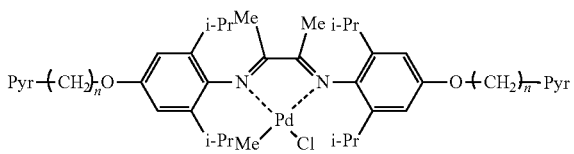
(Id)

The neutral catalysts (Ia)-(Id) have in themselves limited catalytic properties; however, they can be added as such in the reaction mixture and transformed in situ into active catalytic species. To do so, the addition into the reaction mixture of a proper halogen scavenger, i.e. a silver salt, is required.

The catalysts of the invention in form of complex with electrical charge +1 balanced by a counter-anion with charge −1 are obtained by reacting compounds (Ia)-(Id) with acetonitrile in the presence of a soluble silver salt AgY, in which Y is a monovalent anion; in this reaction, the chloride ion of compounds (Ia)-(Id) forms AgCl and is replaced by acetonitrile which coordinates to Pd. The ionic catalysts of the invention obtained in this reaction are (Ie)-(Ih), having the formulas shown below:

(hexafluorophosphate), $[B(C_6H_5)_4]^-$ (tetraphenylborate), $[B(3,5-(CF_3)_2-(C_6H_3)_4]^-$ (tetra-(di-3,5-trifluoromethylphenyl)borate) and, preferably, $SbF_6^-$ (hexafluoroantimonate).

In its second aspect, the invention is about a process for the preparation of olefin-based homo- or copolymers, in which a catalyst of formula (I) is employed.

In a typical embodiment the reactor is loaded with the solvent, the catalyst, and the polar vinyl monomer. It is placed in a preheated oil bath and connected to the ethylene tank. The reactor is purged for 10 minutes with ethylene, and is then pressurized at the desired ethylene pressure. The reaction mixture is kept at constant temperature and pressure for the proper reaction time. Afterward it is cooled down to room temperature and vented. The reaction mixture is poured into a solvent, usually different from that of the reaction mixture. Volatiles are removed under reduced pressure and the reaction product, isolated as a gum or an oil, is dried at constant weight.

The homo- or copolymerization process of the invention, compared to known polymerization processes, has the advantage of being carried out at considerably lower values of pressure and temperature: for instance, the processes presently adopted in the industry require temperatures in

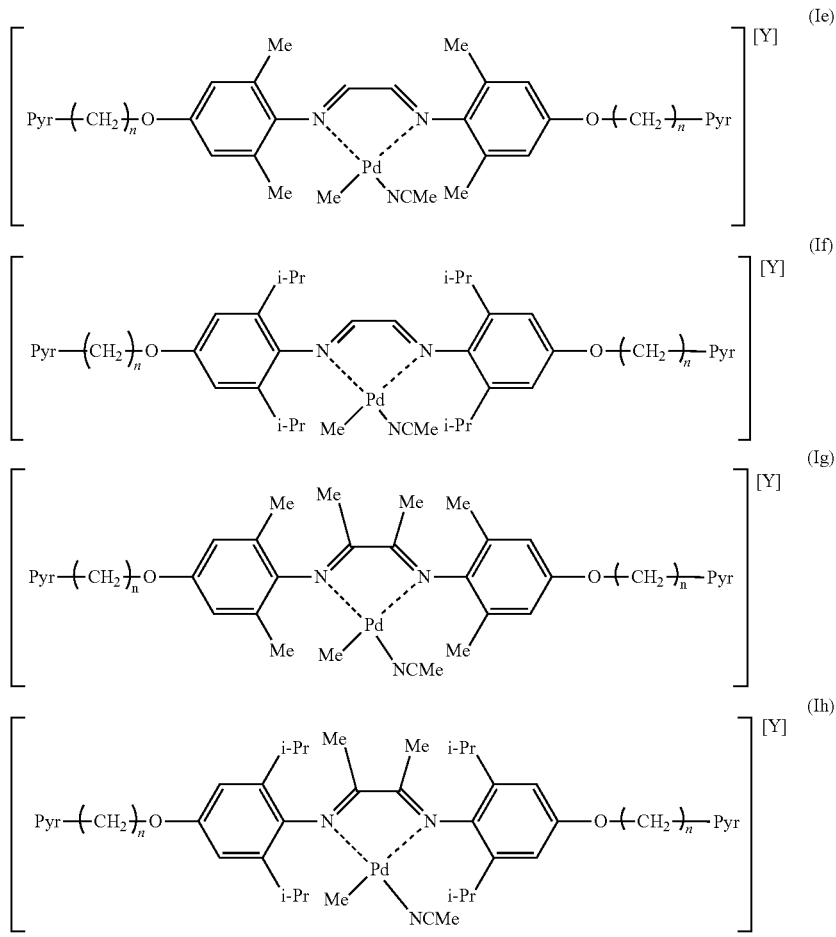

Useful counter-anions Y for the aims of the invention are $CF_3SO_3^-$ (trifluoromethanesulfonate, also known as triflate), $CF_3COO^-$ (trifluoroacetate), $BF_4^-$ (tetrafluoroborate), $PF_6^-$ excess of 200° C. and pressures of about 3,000 bar, while the process of the invention can be conducted at temperatures below 70° C. and pressures below 15 bar.

In a preferred embodiment, the process is carried out in 2,2,2-trifluoroethanol (TFE) as a solvent. It is known in the field that for the copolymerization of olefins with polar monomers (in particular acrylic monomers), these tend to accumulate in the end parts or in side-chains (branches) of the main polymer chain, when catalysts based on N—N ligands are used. The inventors have observed that the use of 2,2,2-trifluoroethanol as solvent for the copolymerization reaction allows obtaining copolymers with a random distribution of said polar monomers either in the main polymer chain or both in the main chain and at the end of the branches in the same macromolecule, with a content of polar monomer not higher than 10% and a molecular weight up to 260,000 Dalton, as described below and as shown in the experimental section that follows. Moreover, the invention makes possible the control of the distribution of the polar monomers by selecting a specific catalyst among the ones of the invention; for instance, the inventors have observed that using catalyst (Ig) in copolymerization, the polar monomer is distributed in the final polymer in part in the side branches, and to some extent in inner parts of the chain; in contrast, operating with catalyst (Ih), the polar monomer is essentially distributed in the main chain of the copolymer.

In its final aspect, the invention is about the polymers that are made available by the process described above.

In case of simple polyolefins (homopolymers) obtained according to the invention, they are characterized by a relatively low degree of branching, generally with less than 100 branches per 1000 carbon atoms of the main chain, and a polydispersity index Mw/Mn of about 1.5.

Copolymers between olefins and polar vinyl monomers, in particular acrylic ones, have different characteristic depending on the specific polar monomer, and on the solvent used for polymerization. In the copolymers obtained using 2,2,2-trifluoroethanol as the reaction solvent, at least 80%, and as much as 99% of the polar monomers are randomly distributed in the main polymer chain, that is, are not next to another polar monomer, and the copolymers have a molecular weight as high as 260,000 Dalton and a content of inserted polar monomer in the range 0.2-4.0 mol %.

The invention will be further described by the examples that follow.

Materials, Instruments and Methods

Deuterated solvents (Cambridge Isotope Laboratories, Inc. (CIL) and Sigma Aldrich) were stored as recommended by sellers.

Anhydrous dichloromethane was obtained by distillation over $CaH_2$ under argon atmosphere.

Ethylene (purity 99.9%) supplied by SIAD S.p.A. (Trieste, Italy), used as received.

Methyl acrylate (99.9%, with 0.02% of hydroquinone monomethyl ether), 2,2,2-trifluoroethanol and all other reagents and solvents were purchased from Sigma-Aldrich/Merck and used without further purification for synthetic, spectroscopic and catalytic purposes.

Chloridocyclooctadienemethylpalladium(II) (also abbreviated [Pd(cod)(CH$_3$)Cl] below) was synthesized according to literature procedures.

$^1$H-NMR:
NMR spectrometer Varian 500 (500 MHz) for ligands and complexes, Varian 400 (400 MHz) for the catalytic products; built-in software;

Spectra recorded in deuterated solvents: $CDCl_3$; $CD_2Cl_2$; the resonances are reported in ppm and referenced to the residual solvent peak versus TMS: $CDCl_3$ at 7.26 ($^1$H) and 77.16 ($^{13}$C), $CD_2Cl_2$ at 5.32 ($^1$H) and 54.00 ($^{13}$C).

$^{13}$C-NMR:
NMR spectrometer Varian 500 (125.68 MHz) for ligands and complexes, Varian 400 (100.55 MHz) for the catalytic products; built-in software; Same solvents as in $^1$H-NMR.

Elemental Analyses
Thermo Flash 2000 CHNS/O analyzer.

MS
High-resolution mass spectra were recorded on an Agilent Time-of-Flight 6210 using ESI-TOF.

Polymers Molecular Weights Mn and Mw
Waters 1525 binary system (Waters S.p.A., Milan, Italy) equipped with a Waters 2414 RI detector using four Styragel columns (range 1,000-1,000,000 Å).

Measures performed through gel permeation chromatography at 30° C., using THF as the solvent, an eluent flow rate of 1 mL/min and 19 narrow polystyrene standards as the reference.

Preparation of Compounds and Polymers
The synthesis of ligands, neutral and cationic complexes was performed using standard Schlenk techniques, under argon, and at room temperature.

Example 1

N,N'-bis(4-(4-(Pyren-2-yl)butoxyl)-2,6-diisopropylphenyl)-2,3-dimethyl-1,4-diazabutadiene-Ligand
(IId)

In a flame-dry Schlenk flask 2,6-diisopropyl-4-(4-(pyren-2-yl)butoxy) aniline (500 mg, 1.11 mmol, 1.0 equiv.) and 2,3-butanedione 4.9 (49 μL, 0.56 mmol, 0.5 eq) were dissolved in dry ethanol (10 mL). The mixture was gently heated with a hot-air gun, under stirring, until all material had dissolved. Formic acid (3-5 drops) was added resulting in the formation of a precipitate. The reaction mixture was stirred overnight, then cooled in an ice bath. The precipitate was collected on a fritter filter, washed with cold ethanol and dried under vacuum.

Ligand (IId) was obtained as a pale yellow solid (755 mg, 63%).

$^1$H NMR (400 MHz, $CD_2Cl_2$): δ 8.35 (dd, J=9.2, 4.4 Hz, 2H), 8.20-7.97 (m, 14H), 7.95 (dd, J=7.7, 3.5 Hz, 2H), 6.71 (s, 4H, Ar—CH), 4.04 (q, J=5.9 Hz, 4H, $CH_2$—O), 3.46 (t, J=7.4 Hz, 4H, $CH_2$-Py), 2.67 (sept, J=6.9 Hz, 4H, CH-iPr), 2.13-1.94 (m, 14H, $CH_2CH_2$, Me-C≡N), 1.12 (m, J=6.8, 2.2 Hz, 24H, Me-iPr).

$^{13}$C NMR (100 MHz, $CD_2Cl_2$): δ 169.71, 156.45, 140.30, 137.55, 137.03, 132.00, 131.50, 130.35, 129.21, 128.05, 127.91, 127.68, 127.05, 126.40, 125.36, 125.21, 124.09, 109.77, 68.38, 54.00, 33.74, 30.11, 29.17, 28.96, 23.29, 22.89, 16.75.

HRMS (ESI): calc for $C_{68}H_{72}N_2O_2$ [M+H]$^+$ 949.56, found 949.5603.

Example 2

N,N'-Bis[4-(4-Pyren-2-Yl)Butoxyl)-2,6-Dimethylphenyl]-2,3-Dimethyl-1,4-diazabutadiene-Ligand
(IIc)

The procedure of Example 1 was followed, using in this case 2,6-dimethyl-4-(4-(pyren-2-yl)butoxy) aniline (500 mg, 1.27 mmol, 1.0 equiv.).

Ligand (IIc) was obtained as a pale yellow solid (585 mg, 55%).

$^1$H NMR (400 MHz, CD$_2$Cl$_2$): δ 8.34 (d, J=9.3 Hz, 2H), 8.23-8.10 (m, 8H), 8.08-7.98 (m, 6H), 7.94 (d, J=7.8 Hz, 2H), 6.64 (s, 4H, Ar—CH), 4.01 (t, J=6.3 Hz, 4H, CH$_2$—O), 3.48-3.41 (m, 4H, CH$_2$-Py), 2.11-1.90 (m, 26H, CH$_2$CH$_2$, Me-C≡N, Me-Ar).

$^{13}$C NMR (100 MHz, CD$_2$Cl$_2$): δ 169.48, 155.64, 142.59, 137.56, 132.00, 131.50, 130.34, 129.20, 128.04, 127.91, 127.67, 127.05, 126.45, 126.40, 125.36, 125.21, 124.09, 114.45, 68.45, 54.00, 33.71, 30.01, 28.92, 18.33, 16.08. HRMS (ESI): calc for C$_{60}$H$_{57}$N$_2$O$_2$ [M+H]$^+$ 837.43, found 837.4404.

Example 3

N,N'-bis[4-(4-pyren-2-yl)butoxyl)-2,6-diisopropylphenyl]-1,4-diazabutadiene-Ligand (IIb)

The procedure of Example 1 was followed, using in this case 1,4-dioxane-2,3-diol 4.8 (67.3 mg, 0.56 mmol, 0.5 equiv.).

Ligand (IIb) was obtained as a pale yellow solid (532 mg, 52%).

$^1$H NMR (400 MHz, CD$_2$Cl$_2$): δ 8.35 (d, J=9.3 Hz, 2H), 8.26-7.97 (m, 16H), 7.94 (d, J=7.8 Hz, 2H), 6.70 (s, 4H, Ar—CH), 4.04 (t, J=6.3 Hz, 4H, CH$_2$—O), 3.49-3.43 (m, 4H, CH$_2$-Py), 2.94 (sept, J=6.8 Hz, 4H, CH-iPr), 2.12-2.04 (m, 4H, CH$_2$CH$_2$), 2.01-1.94 (m, 4H, CH$_2$CH$_2$), 1.15 (d, J=6.9 Hz, 24H, Me-iPr).

$^{13}$C NMR (100 MHz, CD$_2$Cl$_2$): δ 164.17, 157.28, 142.24, 139.14, 137.48, 131.98, 131.48, 130.34, 129.18, 128.03, 127.89, 127.67, 127.05, 126.39, 125.36, 125.21, 124.06, 109.82, 68.33, 33.70, 30.00, 28.89, 28.66, 23.69.

HRMS (ESI): calc for C$_{66}$H$_{69}$N$_2$O$_2$ [M+H]$^+$ 921.53 found 921.5342.

Example 4

N,N'-bis[4-(4-pyren-2-yl)butoxyl)-2,6-dimethylphenyl]-1,4-diazabutadiene-Ligand (IIa)

The procedure of Example 1 was followed, using in this case 2,6-dimethyl-4-(4-(pyren-2-yl)butoxy) aniline (500 mg, 1.27 mmol, 1.0 equiv.) and 1,4-dioxane-2,3-diol 4.8 (76.4 mg, 0.64 mmol, 0.5 equiv.).

Ligand (IIa) was obtained as a pale yellow solid (700 mg, 67%).

$^1$H NMR (400 MHz, CD$_2$Cl$_2$): δ 8.34 (d, J=9.3 Hz, 2H), 8.23-8.10 (m, 8H), 8.10-7.97 (m, 8H), 7.93 (d, J=7.8 Hz, 2H), 6.64 (s, 4H, Ar—CH), 4.02 (t, J=6.3 Hz, 4H, CH$_2$—O), 3.44 (t, J=6.3 Hz, 4H, CH$_2$-Py), 2.15 (s, 12H, Me-Ar), 2.08-2.01 (m, 4H, CH$_2$CH$_2$), 2.00-1.93 (m, 4H, CH$_2$CH$_2$).

$^{13}$C NMR (100 MHz, CD$_2$Cl$_2$): δ 164.04, 156.64, 143.96, 137.49, 131.97, 131.47, 130.33, 129.17, 128.99, 128.03, 127.90, 127.66, 127.05, 126.39, 125.53, 125.46, 125.35, 125.21, 124.06, 114.69, 68.35, 33.67, 29.90, 28.84, 18.96.

HRMS (ESI): calc for C$_{58}$H$_{53}$N$_2$O$_2$ [M+H]$^+$ 809.40 found 809.4083.

Example 5

Compound (Id)

In a Schlenk flask, compound (III) (28.5 mg, 0.107 mmol, 1.0 equiv.) was dissolved in dry CH$_2$Cl$_2$ (3.6 mL). To this stirred solution, a solution of ligand (IId) (124 mg, 0.130 mmol, 1.1 equiv.) in dry CH$_2$Cl$_2$ (2.0 mL) was added. The reaction mixture was stirred at room temperature, in the dark for 22 h, concentrated under vacuum leading to the precipitation of a solid that was filtered under reduced pressure and washed with cold diethyl ether.

Compound (Id) was obtained as a red solid (103 mg, 87%).

The $^1$H NMR spectrum (CD$_2$Cl$_2$, 298 K) of the product is reproduced in FIG. 1.

$^1$H NMR (500 MHz, CD$_2$Cl$_2$, 298 K): δ 8.42-7.87 (m, 18H, CH-Py), 6.80 (s, 2H, Ar—CH), 6.77 (s, 2H, Ar—CH), 4.07 (m, J=5.8 Hz, 4H, CH$_2$—O), 3.47 (t, J=7.3 Hz, 4H, CH$_2$-Py), 3.02 (m, J=19.6, 6.2 Hz, 4H, CH-iPr), 2.12 (m, 4H, CH$_2$CH$_2$), 2.05-1.83 (m, 10H, CH$_2$CH$_2$ and Me-C≡N), 1.38 (d, J=19.0, 6.7 Hz, 6H, Me-iPr), 1.34 (d, J=19.0, 6.7 Hz, 6H, Me-iPr), 1.14 (m, 12H, Me-iPr), 0.40 (s, 3H, Pd-Me).

$^{13}$C NMR (125.68 MHz, CD$_2$Cl$_2$, 298 K): δ=127.84 (CH-Py), 127.66 (CH-Py), 127.43 (CH-Py), 126.83 (CH-Py), 126.16 (CH-Py), 125.08 (CH-Py), 123.85 (CH-Py), 110.04 (Ar—CH), 109.36 (Ar—CH), 68.08 (CH$_2$—O), 33.48 (CH$_2$-Py), 29.77 (CH$_2$CH$_2$), 29.41 (CH-iPr), 28.98 (CH-iPr), 28.68 (CH$_2$CH$_2$), 23.68 (Me-iPr), 23.44 (Me-iPr), 23.20 (Me-iPr), 21.29 (Me-C≡N), 19.87 (Me-C≡N), 2.09 (Pd-Me) ppm.

Example 6

Compound (Ic)

Following the procedure of Example 5, compound (Ic) was obtained as a red solid (80.0 mg, 71%). The characterization in solution of this complex was not possible due to its low solubility in the most common organic solvents.

Example 7

Compound (Ib)

Following the procedure of Example 5, compound (Ib) was obtained as a red solid (44%).

$^1$H NMR (400 MHz, CD$_2$Cl$_2$) δ 8.37-7.93 (m, 20H, CH-Py and H—C≡N), 6.76 (s, 2H, Ar—CH), 6.75 (s, 2H, Ar—CH), 4.07 (q, J=6.0 Hz, 4H, CH$_2$—O), 3.47 (t, J=7.4 Hz, 4H, CH$_2$-Py), 3.20 (m, J=13.6, 6.8 Hz, 4H, CH-iPr), 2.04 (br, J=33.6, 6.8 Hz, 8H, CH$_2$CH$_2$), 1.32 (m, J=11.1, 6.8 Hz, 12H, Me-iPr), 1.12 (dd, J=6.8, 2.2 Hz, 12H, Me-iPr), 0.67 (s, 3H, Pd-Me).

Example 8

Compound (Ia)

Following the procedure of Example 5, compound (Ia) was obtained as an orange-red solid (46%). The characterization in solution of this complex was not possible due to its low solubility in the most common organic solvents.

Example 9

Compound (Ih), Y=SbF$_6^-$

In a Schlenk flask compound (Id) (99 mg, 0.089 mmol, 1.0 equiv.) was dissolved in dry CH$_2$Cl$_2$ (6.2 mL). To this stirred solution, a solution of AgSbF$_6$ (35.5 mg, 0.1033 mmol, 1.1 equiv.) in anhydrous MeCN (0.9 mL) was added. The reaction mixture was stirred at room temperature for 1 h, in the dark, then filtered over Celite. The solvent was removed under vacuum, and, upon addition of n-hexane and sonication (5-30 minutes), the title compound was obtained as a red-brown solid that was filtered under reduced pressure and washed with cold n-hexane (99.3 mg, 82%).

Recrystallization:

All the solid was dissolved in dry $CH_2Cl_2$ (5.0 mL) with the addition of two drops of anhydrous MeCN. The solution was filtered over Celite and concentrated under vacuum. The obtained oil was treated with n-hexane, sonicated and filtered (70.0 mg).

Figure 2:
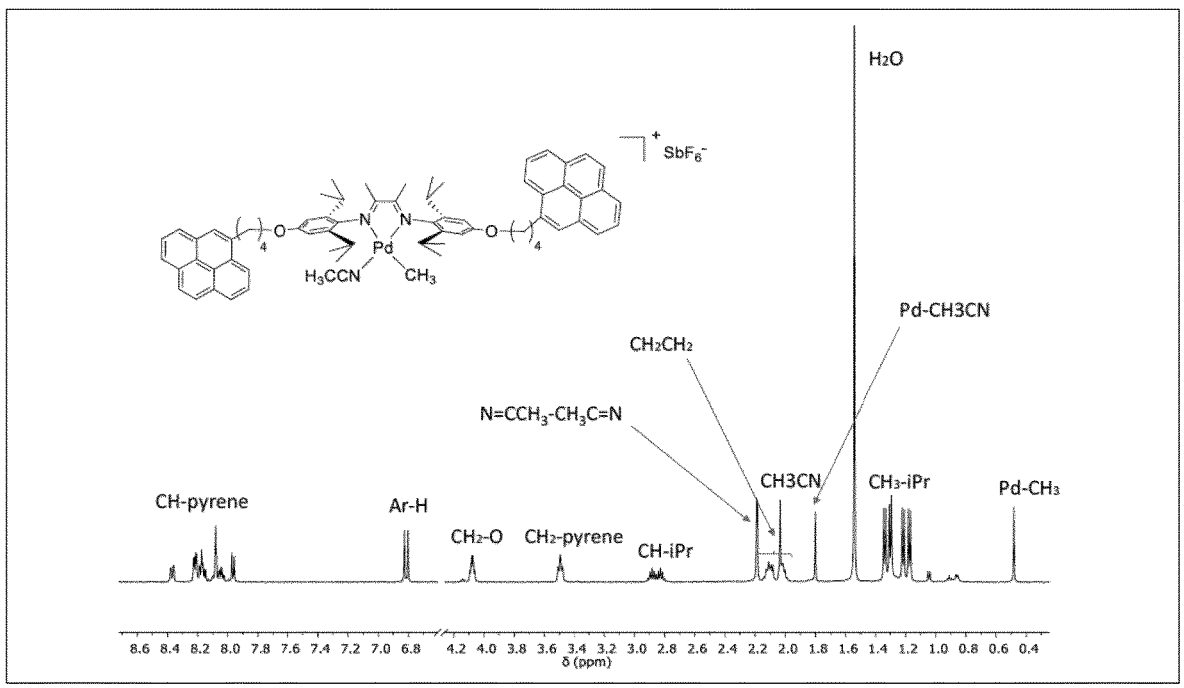

The $^1H$ NMR spectrum ($CD_2Cl_2$, 298 K) of the product is reproduced in FIG. 2.

$^1H$ NMR (500 MHz, $CD_2Cl_2$): δ 8.37 (dd, J=9.3, 2.7 Hz, 2H, CH-Py), 8.27-8.12 (m, 8H), 8.10-8.02 (m, 6H), 7.97 (d, J=7.8 Hz, 2H), 6.80 (s, 2H, Ar—CH), 6.78 (s, 2H, Ar—CH), 4.08 (m, 4H, $CH_2$—O), 3.59-3.27 (m, 4H, $CH_2$-Py), 3.02-2.77 (m, 4H, CH-iPr), 2.19 (s, 3H, Me-C≡N), 2.18 (s, 3H, Me-C≡N), 2.10 (m, 4H, $CH_2CH_2$), 2.02 (m, 7H, $CH_2CH_2$ and free MeCN), 1.80 (s, 3H, Pd—NCMe), 1.30 (d, 6H, Me-iPr), 1.28 (d, 6H, Me-iPr), 1.19 (d, 6H, Me-iPr), 1.15 (d, 6H, Me-iPr), 0.48 (s, 3H, Pd-Me).

$^{13}C$ NMR (125.68 MHz, $CDCl_3$, 298 K): δ 127.48 (CH-Py), 127.32 (CH-Py), 127.07 (CH-Py), 126.62 (CH-Py), 125.92 (CH-Py), 124.79 (CH-Py), 123.36 (CH-Py), 110.14 (Ar—CH), 109.84 (Ar—CH), 67.95 ($CH_2$—O), 32.99 ($CH_2$-Py), 29.35 ($CH_2CH_2$), 29.27 (CH-iPr), 29.03 (CH-iPr), 28.36 ($CH_2CH_2$), 23.31 (Me-iPr), 23.21 (Me-iPr), 22.99 (Me-iPr), 22.61 (Me-iPr), 21.23 (Me-C≡N), 19.59 (Me-C≡N), 6.33 (Pd-Me), 2.12 (Pd—NCMe) ppm.

Elemental analysis, calcd for $C_{71}H_{78}N_3$ (%): C=62.98, H=5.81, N=3.10; found: experimental: C=63.21, H=5.57, N=3.47.

Example 10

Compound (Ig), Y=$SbF_6^-$

Following the procedure of Example 9, the title compound was obtained as an orange solid (104 mg, 74%).

$^1H$ NMR (500 MHz, $CD_2Cl_2$, 298 K): δ 8.33 (d, J=9.2 Hz, 2H, CH-Py), 8.16 (d, J=23.4 Hz, 8H, CH-Py), 8.11-8.01 (m, 6H, CH-Py), 7.93 (d, J=7.8 Hz, 2H, CH-Py), 6.73 (s, 2H, Ar—CH), 6.71 (s, 2H, Ar—CH), 4.03 (d, J=1.6 Hz, 4H, $CH_2$—O), 3.45 (br, 4H, $CH_2$-Py), 2.19 (s, 6H, Ar-Me), 2.14 (s, 3H, Me-C≡N), 2.13 (s, 3H, Me-C≡N), 2.11 (s, 6H, Ar-Me) 2.09-1.84 (m, 8H, $CH_2CH_2$), 1.78 (s, 3H, Pd—NCMe), 0.33 (s, 3H, Pd-Me).

$^{13}C$ NMR (125.68 MHz, $CDCl_3$, 298 K): δ 127.88 (CH-Py), 127.73 (CH-Py), 127.51 (CH-Py), 126.94 (CH-Py), 126.31 (CH-Py), 125.19 (CH-Py), 123.82 (CH-Py), 114.59 (Ar—CH), 68.47 ($CH_2$—O), 33.47 ($CH_2$-Py), 29.62 ($CH_2CH_2$), 28.66 ($CH_2CH_2$), 20.21 (Me-C≡N), 19.21 (Me-C≡N), 18.33 (Me-Ar), 18.19 (Me-Ar), 4.52 (Pd-Me), 2.51 (Pd—NCMe) ppm.

Example 11

Compound (If), Y=$SbF_6^-$

Following the procedure of Example 9, the title compound was obtained as a red-purple solid (81.3 mg, 92%).

$^1H$ NMR (500 MHz, $CD_2Cl_2$, 298 K): δ 8.71-7.79 (br, 18H, CH-Py) 8.18 (s, 2H, H—C≡N), 6.79 (s, 2H, Ar—CH), 6.77 (s, 2H, Ar—CH), 4.07 (br, 4H, $CH_2$—O), 3.69-3.30 (br, 4H, $CH_2$-Py), 3.14 (sept, 2H, CH-iPr), 3.00 (sept, 2H, CH-iPr), 2.24 (s, 3H, free MeCN), 2.07-1.95 (br, 8H, $CH_2CH_2$), 1.92 (s, 3H, Pd—NCMe), 1.31 (d, 6H, Me-iPr), 1.29 (d, 6H, Me-iPr), 1.20 (d, 6H, Me-iPr), 1.16 (d, 6H, Me-iPr), 0.73 (s, 3H, Pd-Me).

$^{13}C$ NMR (125.68 MHz, $CDCl_3$, 298 K): δ 169.95 (H—C≡N), 162.75 (H—C≡N), 110.13 (Ar—CH), 110.09 (Ar—CH), 68.43 ($CH_2$—O), 29.60 ($CH_2CH_2$), 29.43 (CH-iPr), 29.19 (CH-iPr), 24.16 (Me-iPr), 23.85 (Me-iPr), 23.10 (Me-iPr), 22.49 (Me-iPr), 8.02 (Pd-Me), 2.84 (Pd—NCMe), 2.65 (free MeCN) ppm.

Example 12

Compound (Ie), Y=$SbF_6^-$

Following the procedure of Example 9, the title compound was obtained as a red-purple solid (200.7 mg, 84%).

$^1H$-NMR (500 MHz, $CD_2Cl_2$, 298 K) δ 8.33 (d, J=8.1 Hz, 2H, CH-Py), 8.27-7.97 (m, 14H, CH-Py+H—C≡N), 7.93 (m, 2H, CH-Py), 6.71 (s, 2H, Ar—H), 6.68 (s, 2H, Ar—H), 4.03 (br, 4H, $CH_2$—O), 3.45 (br, 4H, $CH_2$-Py), 2.30 (s, 6H, Me-Ar), 2.19 (s, 6H, Me-Ar), 2.11-1.89 (m, 8H, $CH_2CH_2$ and Pd—NCMe), 0.63 (s, 3H, Pd-Me).

$^{13}C$-NMR (125.68 MHz, $CD_2Cl_2$, 298 K): δ 127.71 (CH-Py), 127.57 (CH-Py), 127.36 (CH-Py), 126.78 (CH-Py), 126.14 (CH-Py), 125.03 (CH-Py), 125.01 (CH-Py), 123.65 (CH-Py), 114.65 (Ar—CH), 114.35 (Ar—CH), 68.27 ($CH_2$—O), 33.29 ($CH_2$-Py), 29.37 ($CH_2CH_2$), 28.41 ($CH_2CH_2$), 18.68 (Me-Ar), 18.34 (Me-Ar), 6.14 (Pd-Me), 2.76 (Pd—NCMe) ppm.

Example 13

A 50 mL Büchi "tinyclave" reactor equipped with an interchangeable 50 mL glass vessel was charged with compound (Ih) (Y=$SbF_6^-$) prepared in Example 9 (28.30 mg, 21 μmol), 2,2,2-trifluoroethanol (21 mL) and methyl acrylate (1.130 mL). The reactor was placed in a preheated oil bath at T=308 K and connected to the ethylene tank. Ethylene was bubbled for 10 min, then the reactor was pressurized at 2.5 bar. The reaction mixture was stirred at constant temperature and pressure for 18 h. Afterward, the reactor was cooled to room temperature and vented. The reaction mixture was a suspension containing a white solid; it was poured in methanol (50 mL) to favor additional precipitation, then filtered off. The resulting gummy and off-white solid was held under vacuum until constant weight. 1.5237 g of ethylene/methyl acrylate copolymer were obtained.

Figure 3:
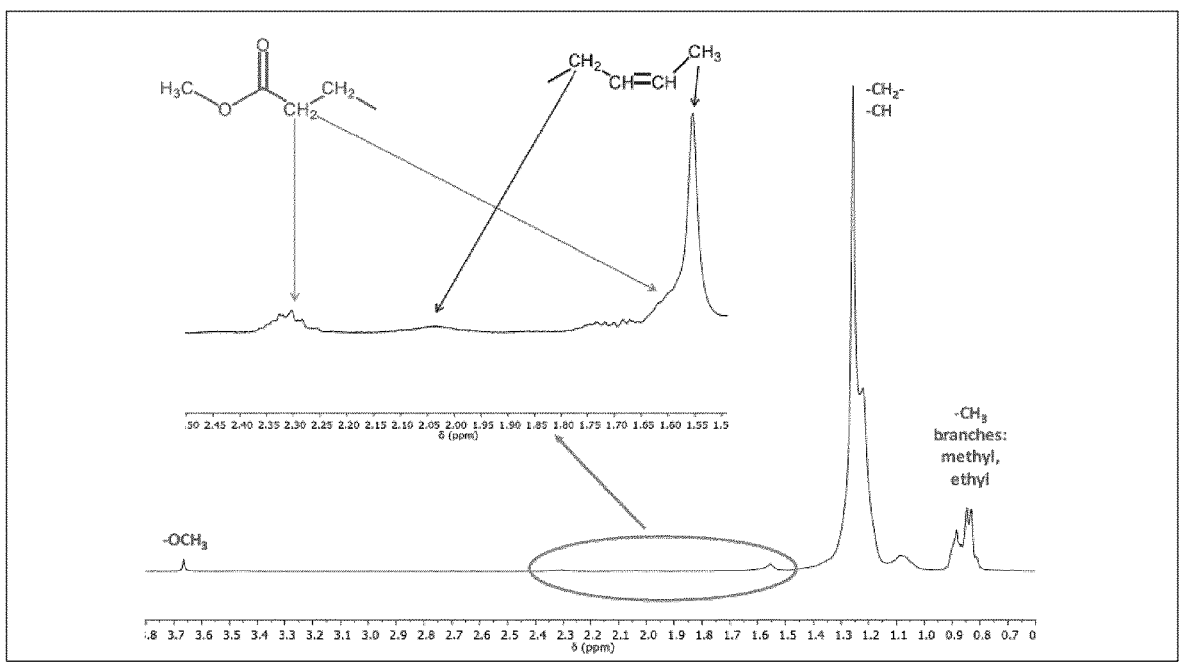
FIG. 3 shows the $^{13}$H-NMR spectrum of a polymer obtained using a catalyst of the invention.

The $^1H$ NMR spectrum ($CDCl_3$, 298 K) of the thus obtained macromolecule is reproduced in FIG. 3.

$^1H$ NMR analysis ($CDCl_3$): ester methoxy at 3.66 ppm, methylenic protons closer to the ester group and allylic protons at 2.30 and 1.50 ppm, methylenic and methynic protons at 1.25 ppm, methyl groups at the end of the branches at 1.0-0.6 ppm. Content of inserted methyl acrylate (determined by $^1H$ NMR analysis): 0.8 mol %. This yield and composition represent 2521 ethylene turnovers and 20 methyl acrylate turnovers. Branching degree: 87 branches per 1000 carbon atoms.

Figure 4:
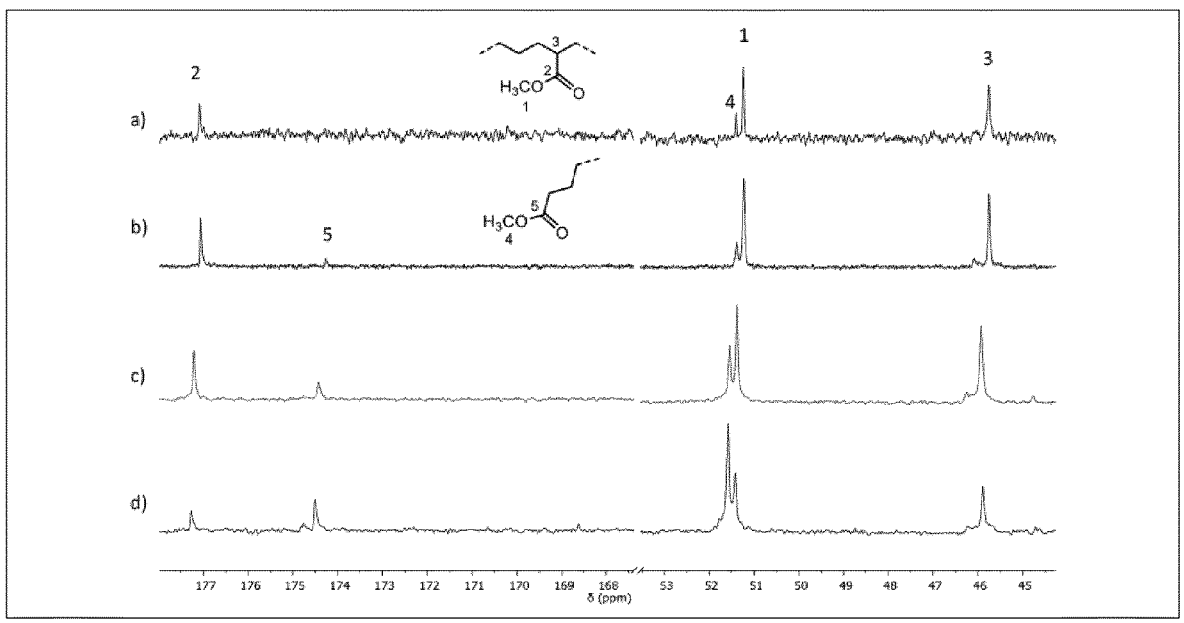
FIG. 4 shows the $^{13}$C-NMR spectra of polymers obtained using different catalysts of the invention.

The $^{13}C$ NMR spectrum ($CDCl_3$, 298 K) of the macromolecule is reproduced in FIG. 4, spectrum a).

$^{13}C$ NMR ($CDCl_3$): 177.25 —$CH_2CH(COOCH_3)CH_2$— (>99%), 51.55 —$CH(CH_2)_nCOOCH_3$, 51.41 —$CH_2CH(COOCH_3)CH_2$—, 45.92 —$CH_2CH(COOCH_3)CH_2$—. Gel permeation chromatography (tetrahydrofuran, 30° C., polystyrene reference) Mn=260,000, Mw/Mn=1.55.

Figure 8:
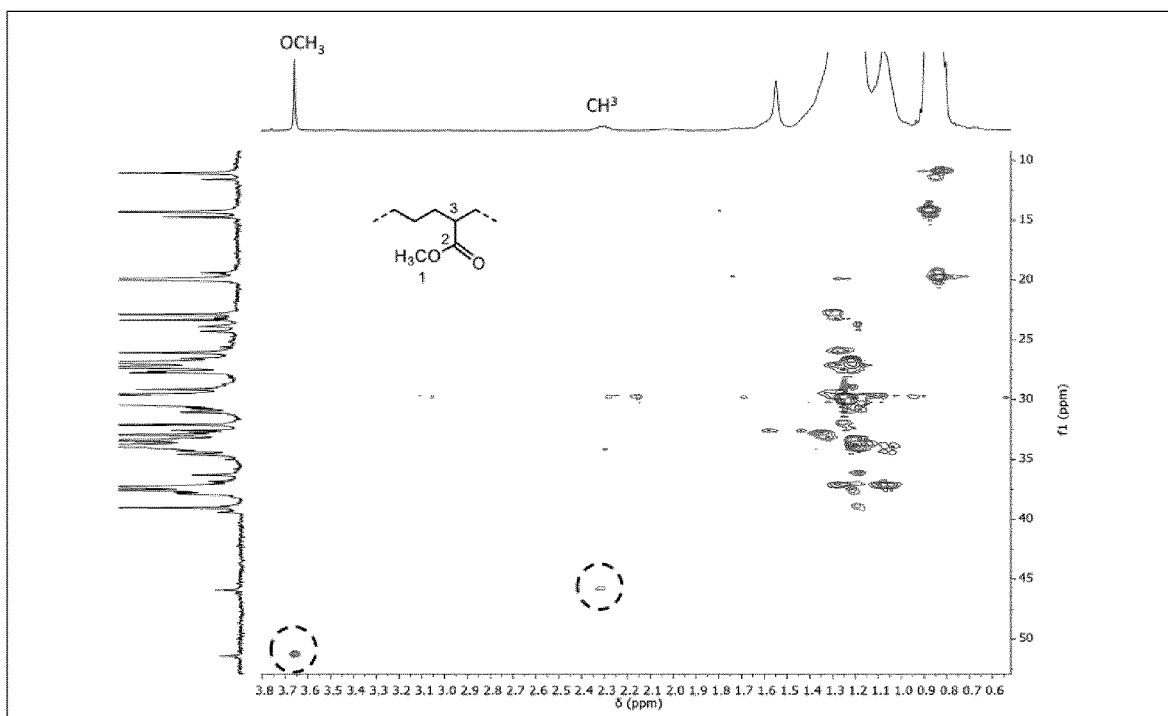
FIG. 8 shows the $^1$H, $^{13}$C-HSQC spectrum of a polymer obtained with a catalyst of the invention.
Figure 9:
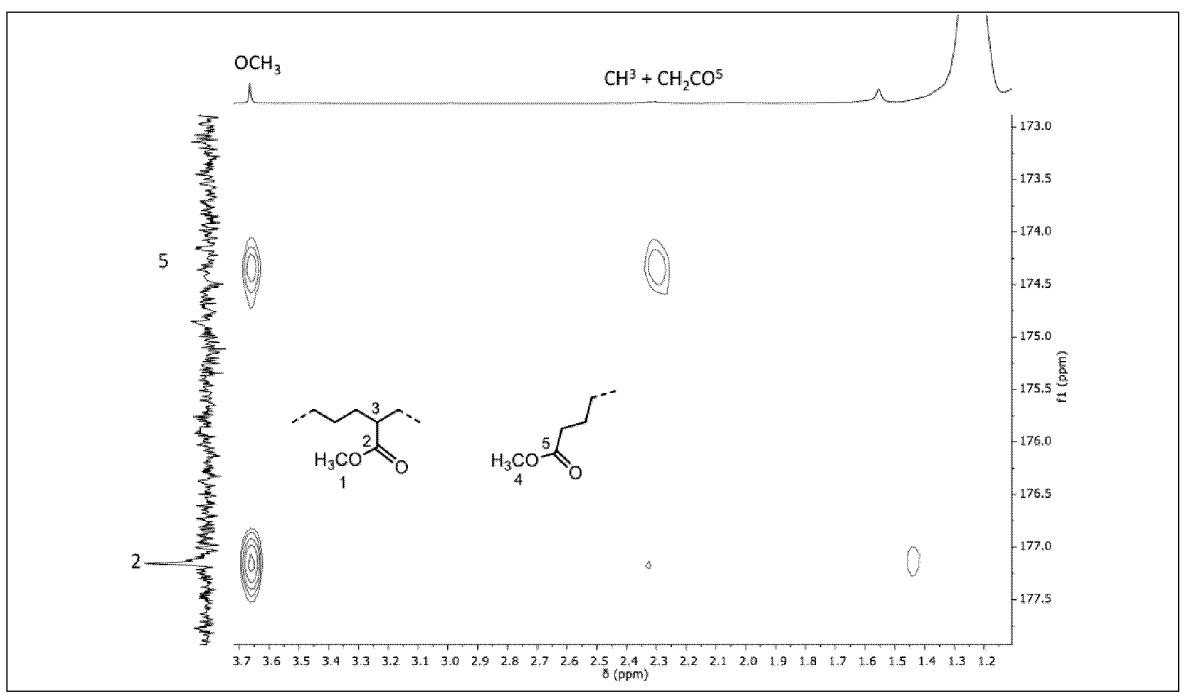
FIG. 9 shows the $^1$H, $^{13}$C-HMBC spectrum of a polymer obtained with a catalyst of the invention.

FIGS. 8 and 9 show respectively the $^1H$, $^{13}C$-HSQC and $^1H$, $^{13}C$-HMBC spectra of this macromolecule.

Figure 10:
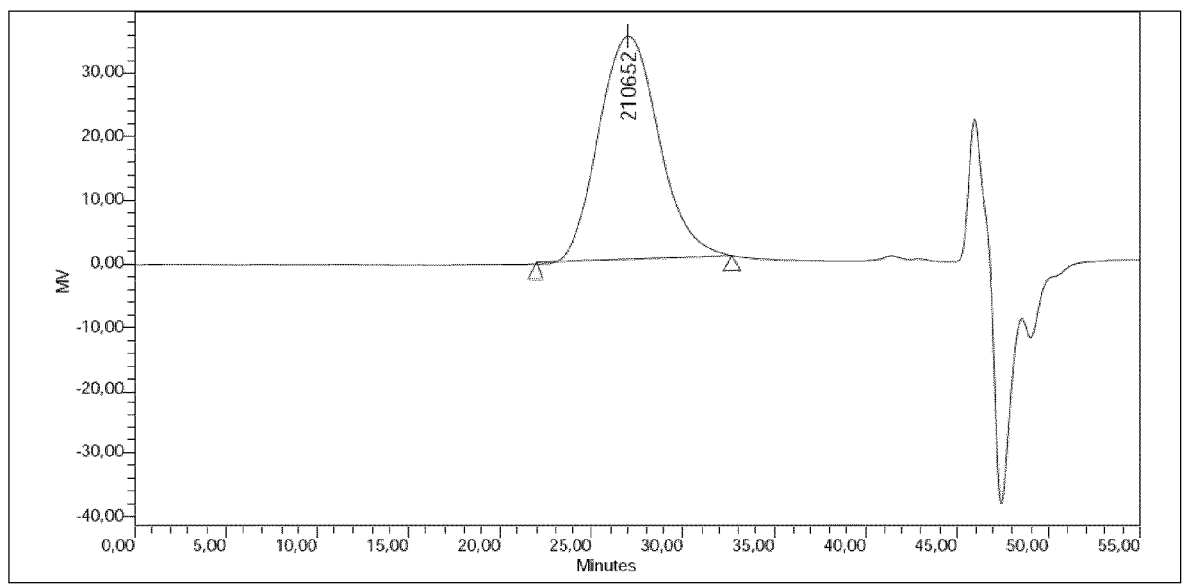
FIGS. 10 to 13 show the gel permeation chromatography traces obtained on ethylene/methyl acrylate copolymers produced according to the invention.

FIG. 10 reports the gel permeation chromatography (GPC) trace of the copolymer obtained; the trace shows a monomodal and narrow distribution of molecular weight of the copolymer chains obtained. This confirms that the monomers have formed one single type of polymer, and that the $^1$H NMR and $^{13}$C NMR data reported above are representative of the real distribution of the methyl acrylate monomer in the copolymer chain.

Example 14

Following the procedure of Example 13, compound (Ig) prepared in Example 10 was used to catalyze the copolymerization of ethylene with methyl acrylate leading to 0.922 g of copolymer as a gummy off-white solid. Content of inserted methyl acrylate (determined by $^1$H NMR analysis): 3.0 mol %. This yield and composition represent 1430 ethylene turnovers and 44 methyl acrylate turnovers. Branching degree: 73 branches per 1000 carbon atoms.

The $^{13}$C NMR spectrum (CDCl$_3$, 298 K) of the macromolecule is reproduced in FIG. 4, spectrum b).

$^{13}$C NMR (CDCl$_3$): 177.22 —CH$_2$CH(COOCH$_3$)CH$_2$— (90%), 174.41 —CH(CH$_2$)$_n$COOCH$_3$ (10%), 51.55 —CH(CH$_2$)$_n$COOCH$_3$, 51.41 —CH$_2$CH(COOCH$_3$)CH$_2$—, 45.92 —CH$_2$CH(COOCH$_3$)CH$_2$—. Gel permeation chromatography (tetrahydrofuran, 30° C., polystyrene reference) Mn=52 000, Mw/Mn=1.53.

Figure 11:
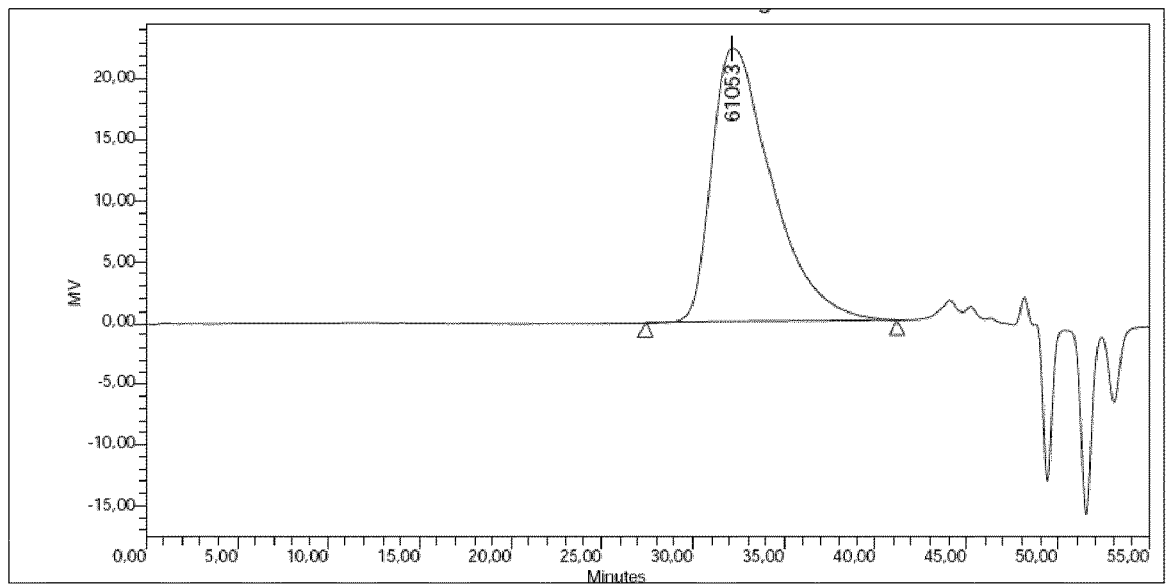

FIG. 11 reports the gel permeation chromatography (GPC) trace of the copolymer thus obtained. Also in this case, it is noted the presence of one single polymeric species, confirming the reliability of $^1$H NMR and $^{13}$C NMR data reported above as indication of the distribution of the methyl acrylate monomer in the copolymer chain.

Example 15

Following the procedure of Example 13, compound (If) prepared in Example 11 was used to catalyze the copolymerization of ethylene with methyl acrylate leading to 0.2911 g of copolymer that was isolated according to the following procedure: at the end of the catalytic reaction, the reactor was cooled to room temperature and vented. The reaction mixture was a brown solution that was poured in a round bottom flask and the glass vessel was rinsed with dichloromethane (3×2 mL). The product was rotary evaporated, leading to a brown oil after removal of the solvent. Content of inserted methyl acrylate (determined by $^1$H NMR analysis): 1.2 mol %. This yield and composition represent 476 ethylene turnovers and 6 methyl acrylate turnovers. Branching degree: 100 branches per 1000 carbon atoms.

The $^{13}$C NMR spectrum (CDCl$_3$, 298 K) of the macromolecule is reproduced in FIG. 4, spectrum c).

$^{13}$C NMR (CDCl$_3$): 177.18 —CH$_2$CH(COOOCH$_3$)CH$_2$— (79%), 174.41 —CH(CH$_2$)$_n$COOCH$_3$ (21%), 51.55 —CH(CH$_2$)$_n$COOCH$_3$, 51.41 —CH$_2$CH(COOCH$_3$)CH$_2$—, 45.92 —CH$_2$CH(COOCH$_3$)CH$_2$—. Gel permeation chromatography (tetrahydrofuran, 30° C., polystyrene reference) Mn=15 000, Mw/Mn=1.52.

Example 16

Following the procedure of Example 15, compound (Ie) prepared in Example 12 was used to catalyze the copolymerization of ethylene with methyl acrylate leading to 0.2999 g of copolymer as a brown oil. Content of inserted methyl acrylate (determined by $^1$H NMR analysis): 3.9 mol %. This yield and composition represent 453 ethylene turnovers and 18 methyl acrylate turnovers. Branching degree: 92 branches per 1000 carbon atoms.

The $^{13}$C NMR spectrum (CDCl$_3$, 298 K) of the macromolecule is reproduced in FIG. 4, spectrum d).

$^{13}$C NMR (CDCl$_3$): 177.25 —CH$_2$CH(COOCH$_3$)CH$_2$— (35%), 174.49 —CH(CH$_2$)$_n$COOCH$_3$ (65%), 51.55 —CH(CH$_2$)$_n$COOCH$_3$, 51.41 —CH$_2$CH(COOCH$_3$)CH$_2$—, 45.92 —CH$_2$CH(COOCH$_3$)CH$_2$—. Gel permeation chromatography (tetrahydrofuran, 30° C., polystyrene reference) Mn=42 000, Mw/Mn=2.00.

Example 17

A 50 mL Büchi "tinyclave" reactor equipped with an interchangeable 50 mL glass vessel was charged with compound (Ih) (Y=SbF$_6^-$) prepared in Example 9 (23.10 mg, 17 µmol) and 2,2,2-trifluoroethanol (21 mL). The reactor was placed in a preheated oil bath at T=308 K and connected to the ethylene tank. Ethylene was bubbled for 10 min, then the reactor was pressurized at 2.5 bar. The reaction mixture was stirred at constant temperature and pressure for 6 h. The reactor was cooled to room temperature and vented. The reaction mixture was a suspension containing a white solid; it was poured in methanol to favor additional precipitation, then filtered off. The resulting gummy and off-white solid was kept under vacuum until constant weight. 0.9494 g of polyethylene were obtained. $^1$H NMR analysis (CDCl$_3$): allylic protons at 2.00 and 1.64 ppm, methylenic and methynic protons at 1.26 ppm, methyl groups at the end of the branches at 1.0-0.6 ppm. This yield represents 1611 ethylene turnovers. Branching degree: 96 branches per 1000 carbon atoms. Gel permeation chromatography (tetrahydrofuran, 30° C., polystyrene reference) Mn=109 000, Mw/Mn=1.47.

Example 18

Ethylene/methyl acrylate copolymerization was carried out according to Example 13, using 2.260 mL of methyl acrylate. The reaction gave 1.4562 g of copolymer as a gummy off-white solid. Content of inserted methyl acrylate (determined by $^1$H NMR analysis): 1.7 mol %. This yield and composition represent 2347 ethylene turnovers and 41 methyl acrylate turnovers. Branching degree: 88 branches per 1000 carbon atoms. $^{13}$C NMR (CDCl$_3$): 177.26 —CH$_2$CH(COOCH$_3$)CH$_2$— (82%), 174.46 —CH(CH$_2$)$_n$COOCH$_3$ (18%), 51.55 —CH(CH$_2$)$_n$COOCH$_3$, 51.41 —CH$_2$CH(COOCH$_3$)CH$_2$—, 45.92 —CH$_2$CH(COOCH$_3$)CH$_2$—. Gel permeation chromatography (tetrahydrofuran, 30° C., polystyrene reference) Mn=159 000, Mw/Mn=1.25.

Example 19

Ethylene/methyl acrylate copolymerization was carried out according to Example 18, at T=318 K. The reaction gave 2.1412 g of copolymer as a gummy off-white solid. Content of inserted methyl acrylate (determined by $^1$H NMR analysis): 1.6 mol %. This yield and composition represent 3462 ethylene turnovers and 56 methyl acrylate turnovers. Branching degree: 85 branches per 1000 carbon atoms. $^{13}$C NMR (CDCl$_3$): 177.25 —CH$_2$CH(COOCH$_3$)CH$_2$— (66%), 174.45 —CH(CH$_2$)$_n$COOCH$_3$ (34%), 51.55 —CH(CH$_2$)$_n$COOCH$_3$, 51.41 —CH$_2$CH(COOCH$_3$)CH$_2$—, 45.92 —CH$_2$CH(COOCH$_3$)CH$_2$—. Gel permeation chromatography (tetrahydrofuran, 30° C., polystyrene reference) Mn=52 000, Mw/Mn=1.66.

Example 20

The copolymerization of ethylene with tert-butyl acrylate was carried out according to Example 13, using 1.81 mL of tert-butyl acrylate. The reaction gave 1.9465 g of copolymer as a gummy off-white solid. Content of inserted tert-butyl acrylate (determined by $^1$H NMR analysis): 0.2 mol %. This yield and composition represent 3274 ethylene turnovers and 7 tert-butyl acrylate turnovers. Branching degree: 88 branches per 1000 carbon atoms. $^{13}$C NMR (CDCl$_3$): 176.17 —CH$_2$CH(COOC(CH$_3$)$_3$)CH$_2$— (>99%), 79.81 —CH$_2$CH (COOC(CH$_3$)$_3$)CH$_2$—, 46.78 —CH$_2$CH(COOC(CH$_3$)$_3$) CH$_2$—. Gel permeation chromatography (tetrahydrofuran, 30° C., polystyrene reference) Mn=143 000, Mw/Mn=1.59.

Example 21

The copolymerization of ethylene with n-butyl acrylate was carried out according to Example 13, using 1.79 mL of n-butyl acrylate. The reaction gave 1.9481 g of copolymer as a gummy off-white solid. Content of inserted n-butyl acrylate (determined by $^1$H NMR analysis): 0.6 mol %. This yield and composition represent 3218 ethylene turnovers and 19 n-butyl acrylate turnovers. Branching degree: 84 branches per 1000 carbon atoms. $^{13}$C NMR (CDCl$_3$): 176.90 —CH$_2$CH(COOCH$_2$(CH$_2$)$_2$CH$_3$)CH$_2$— (83%), 174.13 —CH(CH$_2$)$_n$COOCH$_2$(CH$_2$)$_2$CH$_3$ (17%), 64.26 —CH (CH$_2$)$_n$COOCH$_2$(CH$_2$)$_2$CH$_3$, 63.99 —CH$_2$CH(COOCH$_2$ (CH$_2$)$_2$CH$_3$)CH$_2$—, 46.05 —CH$_2$CH(CO OCH$_2$(CH$_2$)$_2$CH$_3$)CH$_2$—. Gel permeation chromatography (tetrahydrofuran, 30° C., polystyrene reference) Mn=161 000, Mw/Mn=1.65.

Example 22

The copolymerization of ethylene with tert-butyl acrylate was carried out according to Example 20, using compound (Ig) prepared in Example 10. The reaction gave 1.4575 g of copolymer as a gummy off-white solid. Content of inserted tert-butyl acrylate (determined by $^1$H NMR analysis): 0.5 mol %. This yield and composition represent 2419 ethylene turnovers and 12 tert-butyl acrylate turnovers. Branching degree: 79 branches per 1000 carbon atoms. $^{13}$C NMR (CDCl$_3$): 176.21 —CH$_2$CH(COOC(CH$_3$)$_3$)CH$_2$— (>99%), 79.81 —CH$_2$CH(COOC(CH$_3$)$_3$)CH$_2$—, 46.78 —CH$_2$CH (COOC(CH$_3$)$_3$)CH$_2$—. Gel permeation chromatography (tetrahydrofuran, 30° C., polystyrene reference) Mn=69 000, Mw/Mn=1.66.

Figure 5:
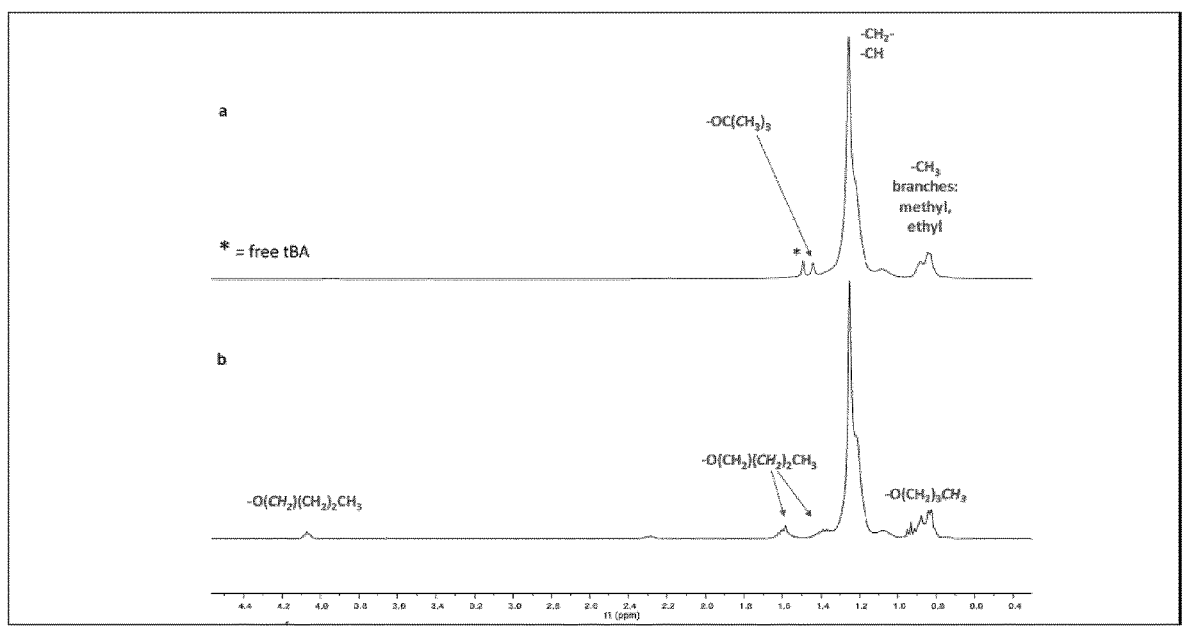
FIG. 5 shows the $^1$H-NMR spectra of two different polymers obtained using a catalyst of the invention.
Figure 6:
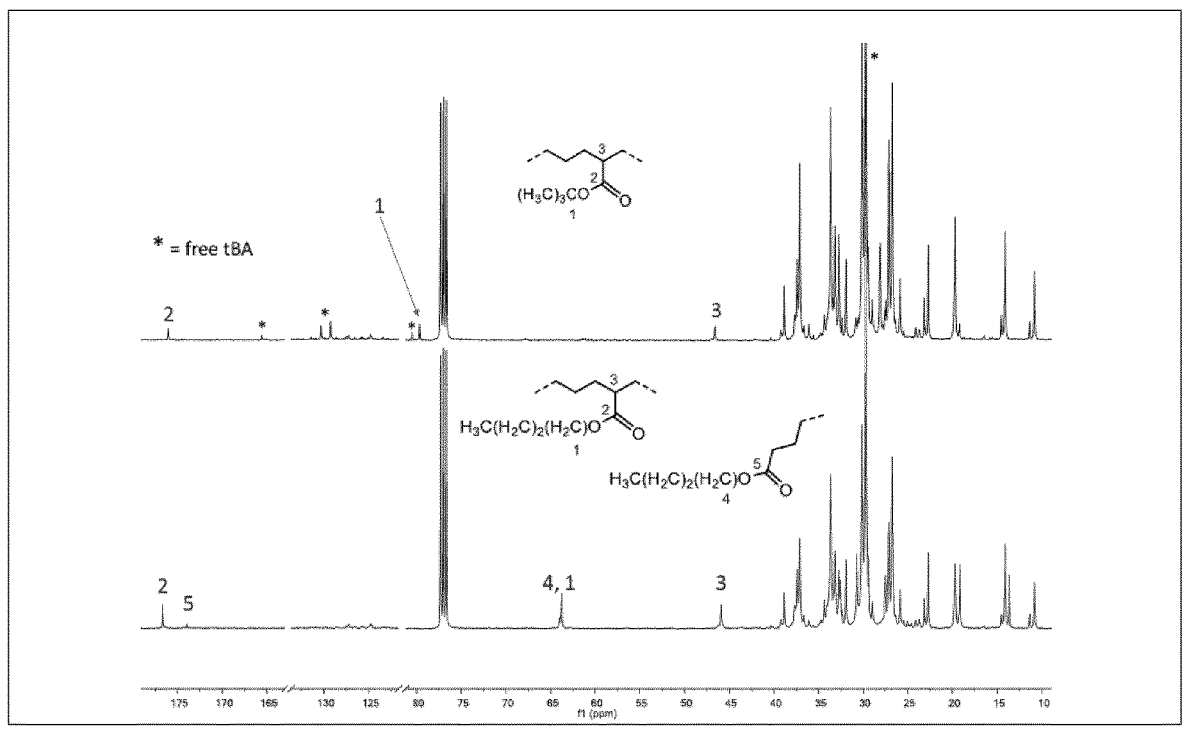
FIG. 6 shows the $^{13}$C-NMR spectra of two different polymers obtained using a catalyst of the invention.

The $^1$H NMR and $^{13}$C NMR spectra of the macromolecule are reported respectively in FIG. 5.*a* and 6.*a*.

Example 23

The copolymerization of ethylene with n-butyl acrylate was carried out according to Example 21, using compound (Ig) prepared in Example 10. The reaction gave 0.7652 g of copolymer as a gummy off-white solid. Content of inserted n-butyl acrylate (determined by $^1$H NMR analysis): 3.2 mol %. This yield and composition represent 1129 ethylene turnovers and 37 n-butyl acrylate turnovers. Branching degree: 84 branches per 1000 carbon atoms. $^{13}$C NMR (CDCl$_3$): 176.86 —CH$_2$CH(COOCH$_2$(CH$_2$)$_2$CH$_3$)CH$_2$— (88%), 174.13 —CH(CH$_2$)$_n$COOCH$_2$(CH$_2$)$_2$CH$_3$ (12%), 64.26 —CH(CH$_2$)$_n$COOCH$_2$(CH$_2$)$_2$CH$_3$, 63.99 —CH$_2$CH (COOCH$_2$(CH$_2$)$_2$CH$_3$)CH$_2$—, 46.05 —CH$_2$CH(CO OCH$_2$ (CH$_2$)$_2$CH$_3$)CH$_2$—. Gel permeation chromatography (tetrahydrofuran, 30° C., polystyrene reference) Mn=61 000, Mw/Mn=1.44.

The $^1$H NMR and $^{13}$C NMR spectra of the macromolecule are reported respectively in FIG. 5.*b* and 6.*b*.

Example 24

The copolymerization of ethylene with methyl acrylate was carried out according to Example 13, using 21 mL of dry dichloromethane as solvent. The reaction gave 2.4431 g of copolymer that was isolated according to the following procedure: at the end of the catalytic reaction, the reactor was cooled to room temperature and vented. The reaction mixture was an orange solution that was poured in methanol (50 mL) leading to the precipitation of a gummy off-white solid that was filtered off. Content of inserted methyl acrylate (determined by $^1$H NMR analysis): 0.9 mol %. This yield and composition represent 4035 ethylene turnovers and 37 methyl acrylate turnovers. Branching degree: 84 branches per 1000 carbon atoms.

Figure 7:
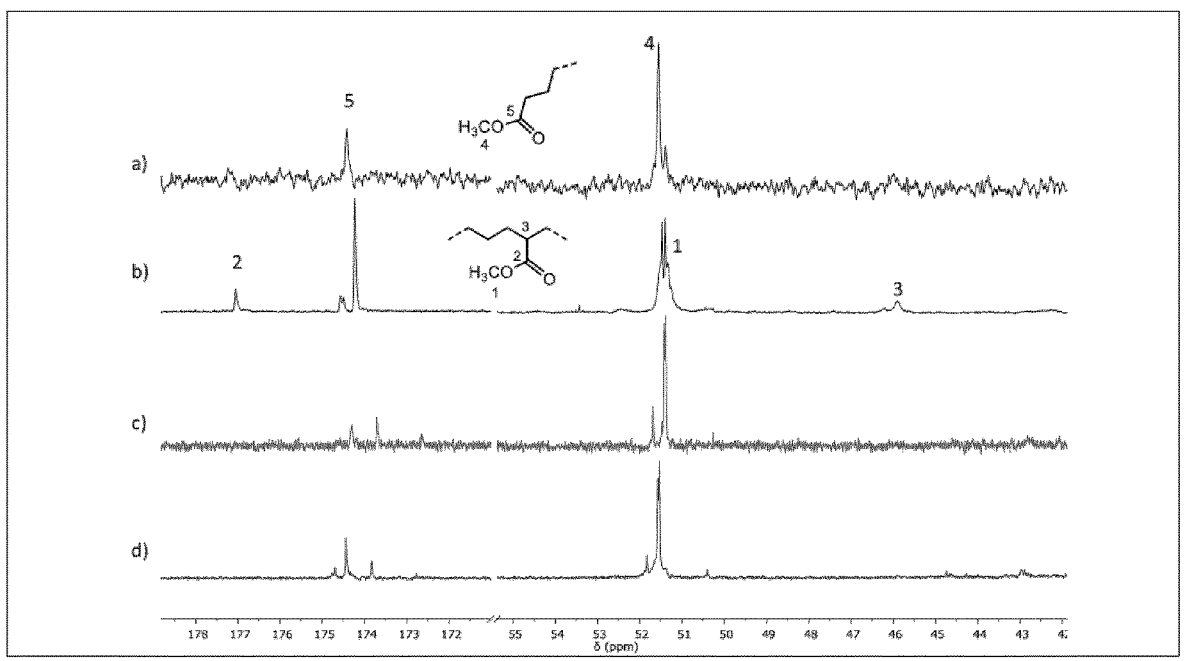
FIG. 7 shows the $^{13}$C-NMR spectra of polymers obtained using different catalysts of the invention.

The $^{13}$C NMR spectrum (CDCl$_3$, 298 K) of the macromolecule thus obtained is reproduced in FIG. 7, spectrum a).

$^{13}$C NMR (CDCl$_3$): 174.42 —CH(CH$_2$)$_n$COOCH$_3$ (>99%), 51.55 —CH(CH$_2$)$_n$COOCH$_3$, 51.41 —CH$_2$CH (COOCH$_3$)CH$_2$—. Gel permeation chromatography (tetrahydrofuran, 30° C., polystyrene reference) Mn=180,000, Mw/Mn=1.56.

Figure 12:
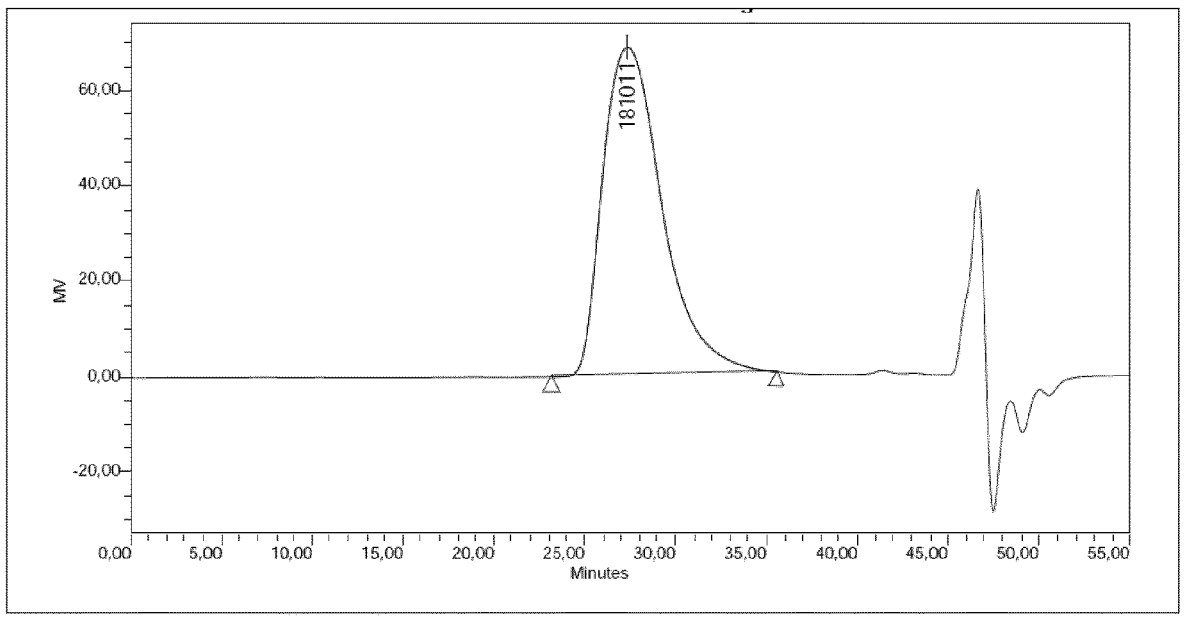

FIG. 12 reports the GPC trace of this copolymer. Also in this case, a monomodal distribution of molecular weight is obtained, but the peak Mw is lower than in the process carried out in TFE as the solvent.

Example 25

The copolymerization of ethylene with methyl acrylate was carried out according to Example 24, using compound (Ig) prepared in Example 10. The reaction gave 1.9356 g of copolymer that was isolated according to the following procedure: at the end of the catalytic reaction, the reactor was cooled to room temperature and vented. The reaction mixture was an orange solution that was poured into methanol (50 mL). The solution was rotary evaporated leading to a brown oil. Content of inserted methyl acrylate (determined by $^1$H NMR analysis): 4.0 mol %. This yield and composition represent 2913 ethylene turnovers and 121 methyl acrylate turnovers. Branching degree: 95 branches per 1000 carbon atoms.

The $^{13}$C NMR spectrum (CDCl$_3$, 298 K) of the macromolecule thus obtained is reproduced in FIG. 7, spectrum b).

$^{13}$C NMR (CDCl$_3$): 177.05 —CH$_2$CH(COOCH$_3$)CH$_2$— (19%), 174.23 —CH(CH$_2$)$_n$COOCH$_3$ (81%), 51.55 —CH (CH$_2$)$_n$COOCH$_3$, 51.41 —CH$_2$CH(COOCH$_3$)CH$_2$—, 45.92 —CH$_2$CH(COOCH$_3$)CH$_2$—. Gel permeation chromatography (tetrahydrofuran, 30° C., polystyrene reference) Mn=24 000, Mw/Mn=1.53.

Figure 13:
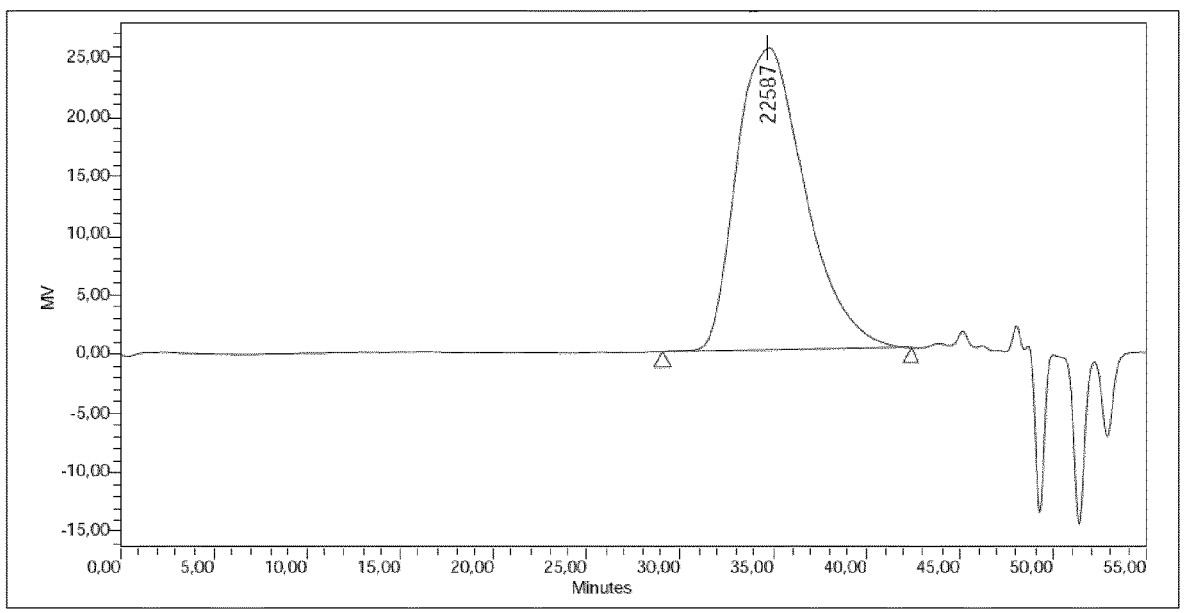

FIG. 13 reports the GPC trace of this copolymer. Also in this case, a monomodal distribution of molecular weight is obtained, but the peak Mw is lower than in the process carried out in TFE with compound (Ig) as the catalyst (Example 14).

Example 26

The copolymerization of ethylene with methyl acrylate was carried out according to Example 24, using compound (If) prepared in Example 11. The reaction gave 0.1507 g of copolymer that was isolated according to the following procedure: at the end of the catalytic reaction, the reactor was cooled to room temperature and vented. The reaction mixture was an orange solution that was poured into methanol (50 mL). The solution was rotary evaporated leading to a brown oil. Content of inserted methyl acrylate (determined by $^1$H NMR analysis): 1.2 mol %. This yield and composition represent 247 ethylene turnovers and 3 methyl acrylate turnovers. Branching degree: 100 branches per 1000 carbon atoms.

The $^{13}$C NMR spectrum (CDCl$_3$, 298 K) of the macromolecule thus obtained is reproduced in FIG. 7, spectrum c).

$^{13}$C NMR (CDCl$_3$): 174.47 —CH(CH$_2$)$_n$COOCH$_3$ (56%), 173.87 (44%), 51.55 —CH(CH$_2$)$_n$COOCH$_3$. Gel permeation chromatography (tetrahydrofuran, 30° C., polystyrene reference) Mn=1 200, Mw/Mn=1.54.

Example 27

The copolymerization of ethylene with methyl acrylate was carried out according to Example 24, using compound (Ie) prepared in Example 12. The reaction gave 0.0952 g of copolymer that was isolated according to the following procedure: at the end of the catalytic reaction, the reactor was cooled to room temperature and vented. The reaction mixture was an orange solution that was poured into methanol (50 mL). The solution was rotary evaporated leading to a brown oil. Content of inserted methyl acrylate (determined by $^1$H NMR analysis): 4.5 mol %. This yield and composition represent 141 ethylene turnovers and 7 methyl acrylate turnovers. Branching degree: 98 branches per 1000 carbon atoms.

The $^{13}$C NMR spectrum (CDCl$_3$, 298 K) of the macromolecule thus obtained is reproduced in FIG. 7, spectrum d).

$^{13}$C NMR (CDCl$_3$): 174.70 (16%), 174.44 —CH(CH$_2$)$_n$COOCH$_3$ (59%), 173.83 (25%), 51.55 —CH(CH$_2$)$_n$COOCH$_3$. Gel permeation chromatography (tetrahydrofuran, 30° C., polystyrene reference) Mn=800, Mw/Mn=1.27.

Comments to the Results

As discussed above and as confirmed by the tests carried out, the catalysts of the invention allow obtaining copolymers between an olefin (especially ethylene) and polar vinyl monomers in good yield without requiring the use of the high temperatures and pressures of the processes presently adopted in the industry. Besides, the specific catalysts of the invention afford copolymers of higher molecular weight (i.e., longer chains generally linked to better mechanical properties) compared, e.g., to the catalysts disclosed in EP 805826 B1. Another advantage of the catalysts of the invention is that they work suitably for the polymers industry needs without needing to use additives, such as alkyl aluminum compounds, e.g. Al(Me)$_3$, Al(Et)$_3$, perfluorophenylboranes, methylallumoxane (also known as MAO) and its derivatives, generally employed to this end. Finally, another important advantage afforded by the invention is the possibility of modulating the kind of copolymer, controlling the amount of polar monomers that ends up in chain terminations (at the end of the main chain or in side branches) and in the main chain of the copolymer, features that have been observed to depend in a predictable way on the specific catalyst selected among the ones here disclosed.

The invention claimed is:

1. A compound of formula (II) below, intermediate in the preparation of a palladium-based catalyst:

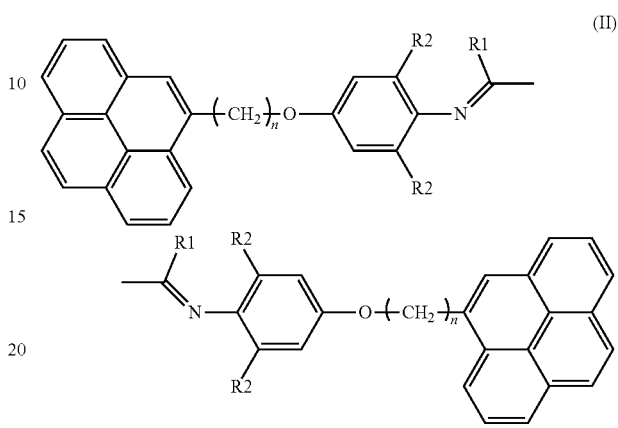

wherein R1 is selected from hydrogen and methyl, R2 is selected from methyl and isopropyl and n is an integer from 1 to 4.

2. A palladium-based catalyst for the preparation of olefin/polar vinyl monomer copolymers and olefin homopolymers, prepared from the compound of formula (II) of claim 1, having general formula (I):

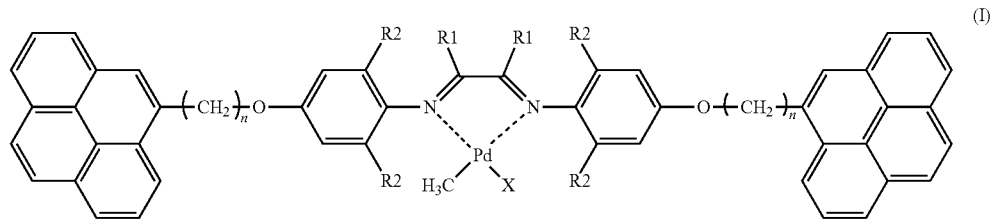

wherein:
  palladium is in oxidation state +2;
  the dashed lines indicate coordination of palladium by the two nitrogen atoms;
  R1 is selected from hydrogen and methyl;
  R2 is selected from methyl and isopropyl;
  n is an integer from 1 to 4;
  X is selected from chloride and acetonitrile, and when is X=CH$_3$CN a monovalent counter-anion Y is present to balance the charge of palladium.

3. The palladium-based catalyst according to claim 2, in which X is the chloride anion, having one of the formulas (Ia)-(Id) below:

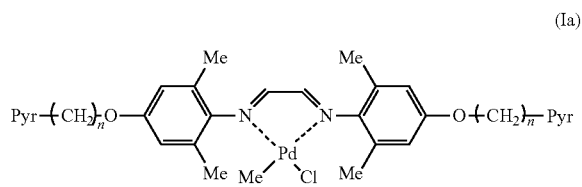

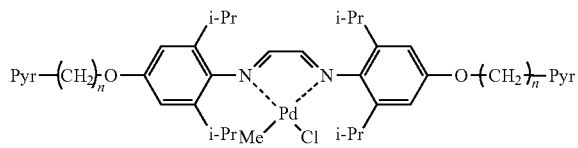

(Ib)

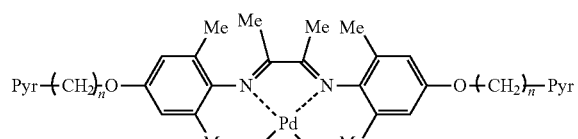

(Ic)

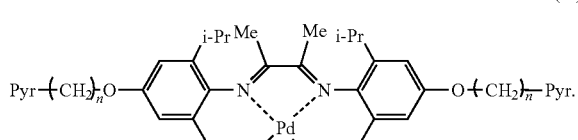

(Id)

4. The palladium-based catalyst according to claim 2, in which X is acetonitrile, having one of the formulas (Ie)-(Ih) below:

5. The palladium-based catalyst according to claim 4, in which the counter-anion Y is selected from $CF_3SO_3^-$ (trifluoromethanesulfonate), $CF_3COO^-$ (trifluoroacetate), $BF_4^-$ (tetrafluoroborate), $PF_6^-$ (hexafluorophosphate), $[B(C_6H_5)_4]^-$ (tetraphenylborate), $[B(3,5-(CF_3)_2-C_6H_3)_4]$(tetra-(di-3,5-trifluoromethyl-phenyl)borate) and $SbF_6^-$ (hexafluoroantimonate).

6. A process for the preparation of an olefin/polar vinyl monomer copolymer or an olefin homopolymer, carried out at a temperature lower than 70° C. and an olefin pressure lower than 15 bar, in which is employed a catalyst of claim 2.

7. The process according to claim 6, wherein the olefin is ethylene, comprising the following steps:
- loading into a reactor a solvent and the catalyst;
- in case of production of an ethylene/polar vinyl monomer copolymer, further loading said polar vinyl monomer into the reactor;
- preheating the reactor and purging it with ethylene;
- pressurizing the reactor at the target ethylene pressure lower than 15 bar;
- at the end of the reaction, allowing the reaction mixture to cool down to room temperature, venting the reactor, pouring the reaction mixture into a solvent, and recovering the produced copolymer or homopolymer by drying to constant weight.

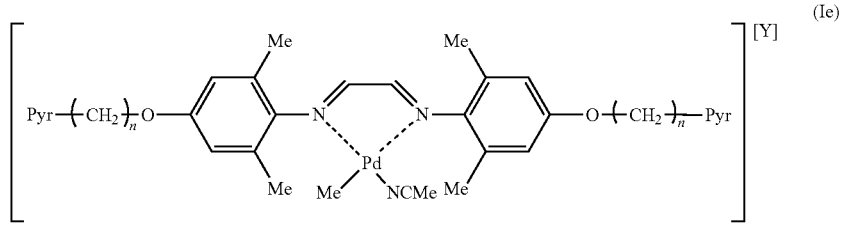

(Ie)

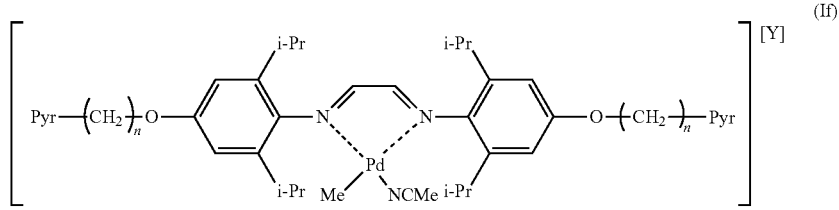

(If)

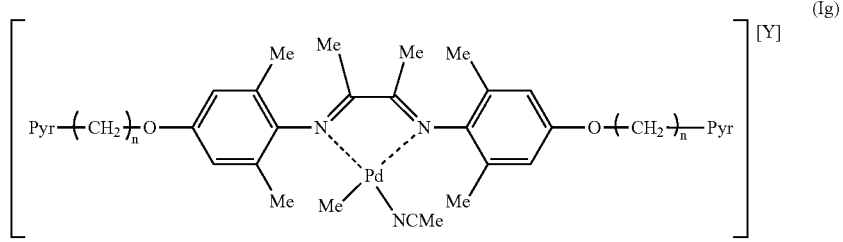

(Ig)

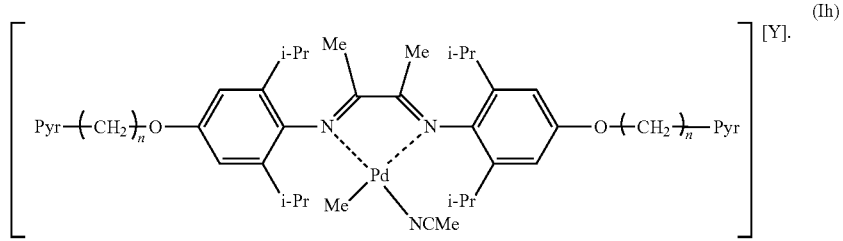

(Ih)

8. The process according to claim 7, in which said solvent is 2,2,2-trifluoroethanol.

\* \* \* \* \*